(12) United States Patent
Fujita et al.

(10) Patent No.: US 12,066,752 B2
(45) Date of Patent: Aug. 20, 2024

(54) LIGHT-SOURCE DEVICE, IMAGE PROJECTION APPARATUS, AND LIGHT-SOURCE OPTICAL SYSTEM

(71) Applicants: Kazuhiro Fujita, Tokyo (JP); Kasumi Nakamura, Kanagawa (JP); Yohei Takano, Kanagawa (JP)

(72) Inventors: Kazuhiro Fujita, Tokyo (JP); Kasumi Nakamura, Kanagawa (JP); Yohei Takano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 288 days.

(21) Appl. No.: 17/760,768

(22) PCT Filed: Oct. 29, 2020

(86) PCT No.: PCT/IB2020/060125
§ 371 (c)(1),
(2) Date: Mar. 16, 2022

(87) PCT Pub. No.: WO2021/084449
PCT Pub. Date: May 6, 2021

(65) Prior Publication Data
US 2022/0342291 A1    Oct. 27, 2022

(30) Foreign Application Priority Data

Nov. 1, 2019  (JP) ................... 2019-200035
Nov. 1, 2019  (JP) ................... 2019-200042
Nov. 1, 2019  (JP) ................... 2019-200043

(51) Int. Cl.
G03B 21/20    (2006.01)
G02B 26/00    (2006.01)

(52) U.S. Cl.
CPC ......... *G03B 21/204* (2013.01); *G02B 26/008* (2013.01); *G03B 21/2013* (2013.01); *G03B 21/2066* (2013.01); *G03B 21/208* (2013.01)

(58) Field of Classification Search
None
See application file for complete search history.

(56) References Cited

U.S. PATENT DOCUMENTS 9,983,471 B1 *   5/2018  Lin .................... H04N 9/3152
2005/0111072 A1  5/2005  Miyagaki et al.
(Continued)

FOREIGN PATENT DOCUMENTS

CN    102720954 A    10/2012
CN    103221735 A    7/2013
(Continued)

OTHER PUBLICATIONS

International Search Report issued on Feb. 1, 2021 in PCT/IB2020/0601250 filed on Oct. 29, 2020, 10 pages.
(Continued)

*Primary Examiner* — Bao-Luan Q Le
*Assistant Examiner* — Danell L Owens
(74) *Attorney, Agent, or Firm* — XSENSUS LLP

(57) ABSTRACT

A light-source device includes an excitation light source to emit first color light; an optical member having a reflecting surface to reflect the first color light; a wavelength conversion unit including a wavelength conversion member on which the first color light reflected by the optical member is incident, the wavelength conversion member to convert at least part of the first color light into second color light having a wavelength different from a wavelength of the first color light and emit the second color light; and a light condensing element to condense the first color light emitted from the wavelength conversion unit. A straight line includ- (Continued)

ing a first optical path from a center of a flux of light rays emitted from the excitation light source, to the center of the first color light on the reflecting surface does not intersect with a light flux condensed by the light condensing element.

14 Claims, 28 Drawing Sheets

(56) References Cited

U.S. PATENT DOCUMENTS

| | | |
|---|---|---|
| 2012/0044465 A1 | 2/2012 | Murai et al. |
| 2013/0010264 A1 | 1/2013 | Takahashi et al. |
| 2013/0021582 A1 | 1/2013 | Fujita et al. |
| 2013/0222772 A1 | 8/2013 | Matsubara |
| 2014/0028983 A1 | 1/2014 | Fujita et al. |
| 2014/0071182 A1 | 3/2014 | Takahashi et al. |
| 2014/0071407 A1 | 3/2014 | Takahashi et al. |
| 2014/0071408 A1 | 3/2014 | Takahashi et al. |
| 2014/0268069 A1 | 9/2014 | Takahashi et al. |
| 2014/0340649 A1 | 11/2014 | Takahashi et al. |
| 2015/0042963 A1 | 2/2015 | Nishimori et al. |
| 2015/0131062 A1 | 5/2015 | Nishimori et al. |
| 2015/0253653 A1 | 9/2015 | Fujita et al. |
| 2015/0267880 A1 | 9/2015 | Hadrath et al. |
| 2015/0316840 A1 | 11/2015 | Maeda et al. |
| 2016/0026076 A1 | 1/2016 | Hu |
| 2016/0103387 A1 | 4/2016 | Nishimori et al. |
| 2016/0223892 A1 | 8/2016 | Takahashi et al. |
| 2016/0320692 A1 | 11/2016 | Takahashi et al. |
| 2016/0349606 A1 | 12/2016 | Nishimori et al. |
| 2016/0377969 A1 | 12/2016 | Nishimori et al. |
| 2017/0299953 A1 | 10/2017 | Maeda et al. |
| 2017/0328540 A1 | 11/2017 | Paul et al. |
| 2018/0024425 A1 | 1/2018 | Fujita et al. |
| 2018/0149955 A1 | 5/2018 | Akiyama |
| 2018/0272538 A1 | 9/2018 | Takahashi et al. |
| 2018/0299757 A1 | 10/2018 | Liao |
| 2019/0101813 A1* | 4/2019 | Miyazaki ............ G03B 21/204 |
| 2019/0110030 A1 | 4/2019 | Chiu et al. |
| 2019/0129288 A1 | 5/2019 | Maeda et al. |
| 2019/0317392 A1 | 10/2019 | Wang et al. |
| 2019/0331990 A1 | 10/2019 | Zhang et al. |
| 2020/0064719 A1 | 2/2020 | Nakamura et al. |
| 2020/0201158 A1 | 6/2020 | Maeda et al. |
| 2020/0301260 A1 | 9/2020 | Takano et al. |
| 2020/0301266 A1 | 9/2020 | Nakamura et al. |

FOREIGN PATENT DOCUMENTS

| | | | | |
|---|---|---|---|---|
| CN | 104020633 A | | 9/2014 | |
| CN | 104820334 A | | 8/2015 | |
| CN | 105301879 A | | 2/2016 | |
| CN | 105676578 A | * | 6/2016 | ........... G03B 21/204 |
| CN | 107111221 A | | 8/2017 | |
| CN | 108107659 A | | 6/2018 | |
| CN | 108761981 A | | 11/2018 | |
| JP | 2011-013320 | | 1/2011 | |
| JP | 2012-123179 | | 6/2012 | |
| JP | 2015-161801 A | | 9/2015 | |
| JP | 2016-058241 | | 4/2016 | |
| JP | 2017-004960 | | 1/2017 | |
| JP | 2019-159287 | | 9/2019 | |
| WO | WO 2011/118536 A1 | | 9/2011 | |
| WO | 2013/104211 A1 | | 7/2013 | |
| WO | WO 2014/182063 A1 | | 11/2014 | |
| WO | 2016/016076 A1 | | 2/2016 | |
| WO | 2016/080295 A1 | | 5/2016 | |
| WO | WO 2016/072360 A1 | | 5/2016 | |

OTHER PUBLICATIONS

Office Action issued Nov. 28, 2023 in Chinese Patent Application No. 202080074496.0.

* cited by examiner

TOTAL ENERGY OF LIGHT INCLUDED IN ☐ : A

TOTAL ENERGY OF LIGHT INCLUDED IN ▨ : B

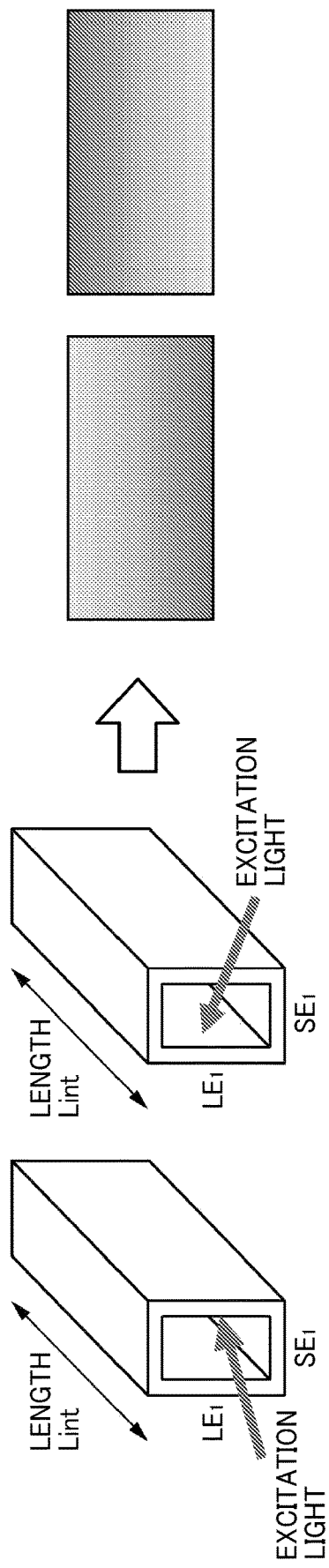

LIGHT-SOURCE DEVICE, IMAGE PROJECTION APPARATUS, AND LIGHT-SOURCE OPTICAL SYSTEM

CROSS-REFERENCE TO RELATED APPLICATIONS

The present application is based on PCT/IB2020/060125 filed on Oct. 29, 2020, and claims priority to JP 2019-200035 filed on Nov. 1, 2019, JP 2019-200042 filed on Nov. 1, 2019, and JP 2019-200043 filed on Nov. 1, 2019, the entire contents of each are incorporated herein by reference.

TECHNICAL FIELD

Embodiments of the present disclosure relate to a light-source device, an image projection apparatus, and a light-source optical system.

BACKGROUND ART

Currently, projectors (or image projection apparatuses) that magnify and project various kinds of images or moving images are widely used. Projectors focus the light emitted by a light source onto a spatial-light modulation element such as a digital micromirror device (DMD) or a liquid crystal display, and display, as a color image, the light emitted from the spatial-light modulation element, which is modulated using a video signal, onto a screen.

In the related art, for example, high-brightness ultrahigh-pressure mercury lamps are used for the light source of projectors. However, the life of such a is short and frequent maintenance is frequently required. In recent years, projectors using. e.g., a laser source or a light emitting diode (LED) light source instead of an ultra-high pressure mercury lamp have been increasing. The laser source and the LED light source have a longer product life than the product life of the ultra-high pressure mercury lamp and have a good color reproducibility due to the monochromaticity.

A projector irradiates an image display element such as a DMD with light of, for example, three colors including red, green, and blue which are primary colors to form an image. All the three colors can be generated by laser sources; however, this is not desirable because a green laser and a red laser have lower emission efficiencies than a blue laser. Thus, there is used a method of irradiating a fluorescent material with a blue laser beam as excitation light to obtain fluorescence light (fluorescence) through wavelength conversion at the fluorescent material and generating red light and green light from the fluorescence light.

Since excitation light of several tens of watts (W) is condensed and emitted to the fluorescent material, the efficiency degradation or the changes over time might occur due to burnout or temperature rise. For this reason, a disc on which a phosphor (fluorescent material) layer is formed is rotated to prevent the irradiation position of the excitation light from being concentrated on one point. The disc is called a phosphor wheel. In the phosphor wheel, the fluorescent material is formed in a fan shape or a toroidal shape along the periphery of the disc.

As an example of a light-source device with a DMD and a phosphor wheel as described above, JP-4711156-B (JP-2011-013320-A) proposes a device in which a part of the phosphor wheel is used as a transmission plate so as to simplify the entire device. In the technology disclosed in JP-4711156-B, the excitation light transmitted through the phosphor wheel is reflected plural times by a mirror, and is directed in the same direction as the fluorescence light. Accordingly, the excitation light and the fluorescence light are combined into the same optical path, and the DMD is irradiated with the excitation light and the fluorescence light.

Further, as another example of a light-source device with a DMD and a phosphor wheel as described above, JP-5817109-B (JP-2012-123179-A) proposes a device in which a part of the phosphor wheel is used as a reflecting plate so as to reduce the size of the entire device. In the technology disclosed in JP-5817109-B, the excitation light is reflected by the phosphor wheel in the same direction as the fluorescence light, and a phase-contrast plate, such as a quarter wave retarder, and a polarization splitter are used to separate the optical paths so as to prevent the reflected excitation light from returning to the excitation light source. Accordingly, the excitation light and the fluorescence light are combined into the same optical path, and the DMD is irradiated with the excitation light and the fluorescence light.

CITATION LIST

Patent Literature

[PTL 1]
JP-4711156-B (JP-2011-013320-A)
[PTL2]
JP-5817109-B (JP-2012-123179-A)

SUMMARY OF INVENTION

Problems to be Solved

In the configuration of JP-4711156-B, however, the optical path of the excitation light is bypassed, and accordingly, the entire light-source device upsizes. Further, in the configuration of JP-5817109-B, the use of phase-contrast plate and polarization splitter increases the cost. In addition, the optical path of the excitation light proceeding to the phosphor wheel and the optical path of the excitation light reflected from the phosphor wheel passes through the same position in phase-contrast plate or the polarization splitter. For this reason, the light condensing density on these optical elements might increase, and this might cause damage or the like, thus resulting in a decrease in reliability.

An object of the present disclosure is to provide a light-source device that can be downsized and produced at a low cost, an image projection apparatus incorporating the light-source device, and a light-source optical system incorporating the image projection apparatus.

Solution to Problem

According to an aspect of the present disclosure, a light-source device includes an excitation light source, an optical member, a wavelength conversion unit, and a light condensing element. The excitation light source emits first color light. The optical member has a reflecting surface to reflect the first color light. The wavelength conversion unit includes a wavelength conversion member on which the first color light reflected by the optical member is incident. The wavelength conversion member converts at least part of the first color light into second color light having a wavelength different from a wavelength of the first color light and emit the second color light. The light condensing element condenses the first color light emitted from the wavelength conversion unit. A straight line including a first optical path does not intersect with a light flux condensed by the light condensing element, where the first optical path is an optical path from a center of a flux of light rays emitted from the excitation light source, to the center of the first color light on the reflecting surface.

Advantageous Effects of Invention

Embodiments of the present disclosure can provide a light-source device that can be downsized and produced at a low cost, an image projection apparatus incorporating the light-source device, and a light-source optical system incorporating the image projection apparatus.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 1A and 1B are schematic diagrams of a light-source device according to an embodiment of the present disclosure, in which FIG. 1A is a schematic diagram of an optical arrangement of the light-source device; and FIG. 1B is a schematic diagram of an example of excitation light projected on a dichroic mirror of the light-source device of FIG. 1A.

FIGS. 5A, 5B, and 5C are schematic views of a light-source device according to still another embodiment of the present disclosure, in which FIG. 5A is a schematic diagram of an optical arrangement of the light-source device, FIG. 5B is a facing view of a rod integrator in the light-source device as viewed from an incident aperture plane side, and FIG. 5C is a facing view of the rod integrator as viewed from an exit aperture plane.

FIGS. 6A and 6B are schematic views of a light-source device according to still another embodiment of the present disclosure, in which FIG. 6A is a schematic diagram of an optical arrangement of an optical path of excitation light, and FIG. 6B is a schematic diagram of an optical arrangement of an optical path of fluorescence light in the embodiment.

FIGS. 10A and 10B are schematic diagrams of the light-source device according to the first embodiment, in which FIG. 10A is a schematic diagram of an optical arrangement of an optical path of blue laser light, and FIG. 10B is a schematic diagram of an optical arrangement of an optical path of fluorescence light.

FIGS. 13A and 13B are illustrations of the configuration of a phosphor unit included in the light-source device according to the first embodiment, in which FIG. 13A is a front view of the phosphor unit from an incident direction of blue light, and FIG. 13B is a side view of the phosphor unit from a direction orthogonal to the incident direction of blue light.

FIGS. 14A and 14B are illustrations of the configuration of a color wheel included in the light-source device according to the first embodiment, in which FIG. 14A is a front view of the color wheel from an incident direction of blue light and fluorescence light, and FIG. 14B is a side view of the color wheel from a direction orthogonal to the incident direction of blue light and fluorescence light.

FIGS. 15A and 15B are illustrations of a light tunnel included in the light-source device according to the first embodiment, in which FIG. 15A is a pattern diagram of an example of incidence of light on an incident aperture, and FIG. 15B is a pattern diagram of another example of incidence of light on the incident aperture of the light tunnel.

FIGS. 16A and 16B are schematic diagrams of optical paths of a light-source device according to a second embodiment of the present disclosure, in which FIG. 16A is a schematic diagram of an optical arrangement of an optical path of blue light and FIG. 16B is a schematic diagram of an optical arrangement of an optical path of fluorescence light.

FIGS. 18A and 18B are schematic diagrams of a light-source device according to a third embodiment of the present disclosure, in which FIG. 18A is a schematic diagram of an optical arrangement of an optical path of blue laser light, and FIG. 18B is a schematic diagram of an optical arrangement of an optical path of fluorescence light.

FIGS. 19A and 19B are schematic diagrams of a light-source device according to a fourth embodiment of the present disclosure, in which FIG. 19A is a schematic diagram of an optical arrangement of an optical path of blue laser light, and FIG. 19B is a schematic diagram of an optical arrangement of an optical path of fluorescence light.

FIGS. 21A and 21B are schematic views of a light-source device according to a fifth embodiment of the present disclosure, in which FIG. 21A is an optical arrangement diagram of the light-source device viewed from a direction facing an emission surface of a light source, and FIG. 21B is an optical arrangement diagram of the light-source device obtained by rotating the light-source device of FIG. 21A by 90 degrees around a vertical axis.

FIGS. 22A and 22B illustrate a part of a light-source device according to a fifth embodiment of the present disclosure, in which FIG. 22A is an optical path diagram illustrating a state in which blue light is incident on a dichroic mirror, and FIG. 22B is an optical path diagram illustrating a state in which blue light is incident on a phosphor unit.

FIGS. 23A and 23B are schematic views of a light-source device according to a sixth embodiment of the present disclosure, in which FIG. 23A is an optical arrangement diagram of the light-source device viewed from a lateral side direction, and FIG. 23B is an optical arrangement diagram of the light-source device viewed from a plane direction.

FIGS. 24A and 24B are schematic views of a light-source device according to the second embodiment for comparison with the sixth embodiment, in which FIG. 24A is an optical arrangement diagram of the light-source device viewed from a lateral side direction, and FIG. 24B is an optical arrangement diagram of the light-source device viewed from a plane direction.

FIG. 27 is a perspective view of an example of a light mixing element according to an embodiment of the present disclosure, illustrated with examples of appearance of luminance unevenness.

DESCRIPTION OF EMBODIMENTS

Figure 1A:
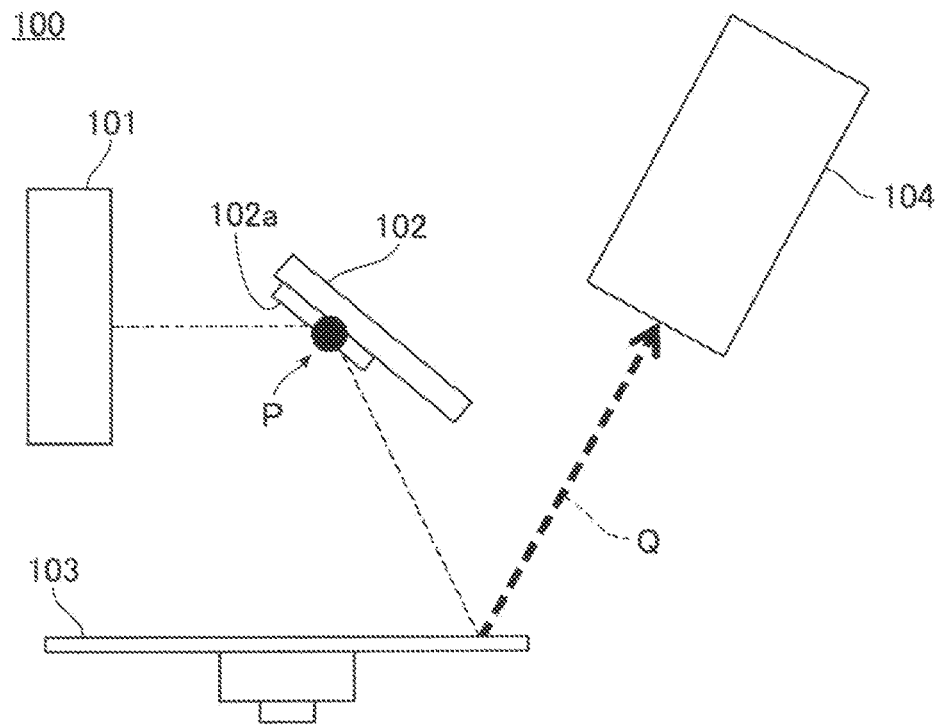

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Some embodiments of the present disclosure are described below, but no limitation is indicated thereby and various applications and modifications may be made without departing from the scope of the disclosure. In the drawings referred below, the same reference codes are used for the common elements the description thereof are omitted as appropriate. Light-source devices are known provided with a DMD and a phosphor wheel whose part is used as a reflector so as to reduce the size of the entire light-source device. In such light-source devices, the excitation light is reflected by the phosphor wheel in the same direction as the fluorescence light, and a phase-contrast plate, such as a quarter (¼) wave retarder, and the polarization splitter are arranged on the optical path to prevent the reflected light from returning to a light source of the excitation light.

In the light-source device having such a configuration, the phase-contrast plate and the polarization splitter are disposed on the optical path of the excitation light, thus hampering downsizing of the light-source device and increasing the production cost. In addition, the optical path of the excitation light proceeding to the phosphor wheel and the optical path of the excitation light reflected from the phosphor wheel pass through the same position in phase-contrast plate or the polarization splitter. Accordingly, the light condensing density on the optical elements increases, which might cause damage or a decrease in reliability of the light-source device.

The present inventors have paid attention to the fact that such a configuration of the light-source device hampers the downsizing of the device body and the reduction in cost, and also causes a decrease in reliability. Then, the present inventors have found that a configuration in which the optical path of the excitation light proceeding to the phosphor wheel and the optical path of the excitation light reflected from the phosphor wheel do not overlap with each other contribute to the downsizing of the device body, the cost reduction, and an increase in reliability, Thus, present inventors have conceived of the embodiments of the present disclosure.

At least one embodiment of the present disclosure provides a light-source device including a light source that emits excitation light, an optical member having a reflecting surface that reflects the excitation light emitted from the light source, and a wavelength conversion unit including a wavelength conversion member configured to convert at least some of the excitation light into a fluorescence light having a wavelength different from a wavelength of the excitation light and emit the converted fluorescence light. In such a light-source device, a point P and a light flux Q are disposed not to intersect with each other, where the point P is the center of a projection image of the excitation light projected onto the reflecting surface of the optical member, and the light flux Q is a light flux of excitation light emitted from the wavelength conversion unit.

According to at least one embodiment of the present disclosure, the light flux of the excitation light emitted from the wavelength conversion unit does not intersect with the center of the projection image of the excitation light emitted from the light source. Such a configuration can prevent pieces of the excitation light from passing through the same location on the optical member. Accordingly, the optical member can be prevented from being damaged due to an increase in the light condensing density, thus enhancing the reliability of the device. Such a configuration can also obviate the necessity of particular optical elements such as a phase-contrast plate and a polarization splitter to separate the optical path of the excitation light emitted from the wavelength conversion unit, from the other optical path. Accordingly, the number of components and the cost for producing the device can be reduced, thus achieving a reduction in the size of the device.

Figure 1B:
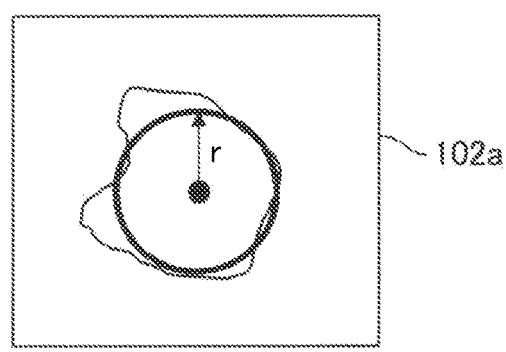

FIGS. 1A and 1B are illustrations of a light-source device 100 according to an embodiment of the present disclosure. FIG. 1A is an illustration of components of the light-source device 100 according to the present embodiment. FIG. 1B is an illustration of excitation light projected onto a reflecting surface 102a of a dichroic mirror 102 of the light-source device 100. FIG. 1B depicts the reflecting surface 102a as viewed from a direction of travel of excitation light from a light source 101.

As illustrated in FIG. 1A, the light-source device 100 includes the light source 101, which is an excitation light source, and the dichroic mirror 102, which is an example of an optical member. The light-source device 100 also includes a phosphor unit 103, which is an example of a wavelength conversion unit (wavelength converter), and a rod integrator 104, which is an example of a light mixing element.

The light-source device 100 according to an embodiment of the present disclosure is not limited to the configuration illustrated in FIG. 1, and can be appropriately changed. In some embodiments, for example, the light-source device 100 may include only the light source 101, the dichroic mirror 102, and the phosphor unit 103. In the light-source device 100 including the light source 101, the dichroic mirror 102, and the phosphor unit 103, the components other than the light source 101 constitute a light-source optical system.

The light source 101 emits excitation light (also referred to as "first color light" in the following description). The dichroic mirror 102 has the reflecting surface 102a that reflects the excitation light emitted from the light source 101 and guides the excitation light to the phosphor unit 103. The portion of the dichroic mirror 102 other than the reflecting surface 102a may have an optical property that transmits the excitation light emitted from the light source 101 and the fluorescence light emitted from the phosphor unit 103.

The phosphor unit 103 has a first area that reflects or diffuse-reflects the excitation light and a second area that converts at least a part of the excitation light into fluorescence light having a wavelength different from the wavelength of the excitation light and emits the fluorescence light. The fluorescence light may be referred to as "second colored light". Once the excitation light is incident on the phosphor unit 103, the phosphor unit 103 alternately emits the excitation light and the fluorescence light to the incident-surface side (upward in FIG. 1A) on which the excitation light has been incident, in a sequential manner. The rod integrator 104 is disposed such that the excitation light and the fluorescence light emitted from the phosphor unit 103 are directed to and incident on the rod integrator 104. The rod integrator 104 mixes and homogenizes the incident excitation light and fluorescence light to emit the mixed light to the outside of the light-source device 100.

FIG. 1A depicts a case in which the first area of the phosphor unit 103 is present on the optical path of the excitation light emitted from the light source 101. The excitation light emitted from the light source 101 is reflected by the reflecting surface 102a of the dichroic mirror 102 toward the phosphor unit 103. The excitation light reflected by the reflecting surface 102a is reflected by the first area of the phosphor unit 103 toward the incident-plane side on which the reflected excitation light has been incident on the phosphor unit 103. The rod integrator 104 is disposed on the way in which the excitation light is reflected by the phosphor unit 103.

In the light-source device 100 in which the optical path of the excitation light is formed as described above, the center of the excitation light on the reflecting surface 102a of the dichroic mirror 102 is defined as a point P. The light flux of the excitation light emitted from the phosphor unit 103 is referred to as a light flux Q. In the light-source device 100, the dichroic mirror 102, the phosphor unit 103, and the rod integrator 104 are arranged so that the point P and the light flux Q do not intersect with each other.

The point P of the excitation light on the reflecting surface 102a, in other words, the center of the projection image of the excitation light to be projected is defined as follows. (1) A case in which the light intensity distribution within the projection area of the excitation light projected onto the reflecting surface 102a is line-symmetric or point-symmetric. The center of the minimum circumscribed circle (circumcircle) of the projection area of the excitation light is set as the center of the projection image center. (2) A case in which the light intensity distribution of the projection area of the excitation light projected on the reflecting surface 102a is other than line symmetric or point symmetric, in other words, a case other than the above case (1). As illustrated in FIG. 1B, A denotes the total energy of the excitation light projected onto the reflecting surface 102a and B denotes the total energy of light included in any desired circle with a radius r within the projection area. The ratio of B with respect to A (B/A) is greater than or equal to 93% (B/A≥93%) and the center of the circle with a radius r, at which the energy density is maximum within the circle, is set as the center of the projection image.

Note that the projection area of the excitation light is a range having an energy of $1/e^2$ or more of the maximum energy within the energy distribution of the excitation light projected onto the reflecting surface 102a. The energy density is obtained by dividing the "energy contained in the circle" by the "area of the circle", in other words, energy density=energy contained in the circle/area of the circle. Note that the point P, i.e., the center of the projection image of the excitation light as defined above is determined with all the light source 101 within the light-source device 100 turned on.

Further, the light flux Q of the excitation light emitted from the phosphor unit 103 is a light flux of light rays passing through the range having the energy of $1/e^2$ or more of the maximum energy within the energy distribution of the excitation light on a plane perpendicular to the propagation direction of the excitation light. The center of the flux of light rays emitted from the light source is defined as the center of a light-flux width (of light intensities of $1/e^2$ or more) of the flux of light rays or a portion having a highest light intensity of the flux of light rays.

In the light-source device 100 according to the present embodiment, the light flux Q of the excitation light emitted from the phosphor unit 103 does not intersect the center of the projection image of the excitation light, which is the center of the excitation light emitted from the light source 101 on the reflecting surface 102a. Such a configuration can prevent the excitation light from being transmitted through the same portion on the dichroic mirror 102 and restrain damage to the dichroic mirror 102 due to an increase in light condensing density. Such a configuration can also obviate the necessity of particular optical elements such as a phase-contrast plate and a polarization splitter to separate the optical path of the excitation light emitted from the phosphor unit 103, from the other optical path. Accordingly, the number of components and the cost for producing the device can be reduced, thus achieving a reduction in the size of the device.

In the light-source device 100 illustrated in FIGS. 1A and 1B, the phosphor unit 103 alternately switches and emits the excitation light and the fluorescence light in a sequential manner, in other words, emits the excitation light and the fluorescence light in a time division manner. However, the phosphor unit 103 is not limited to such a configuration, and may have a configuration of simultaneously emitting excitation light and fluorescence light.

For example, instead of the first area and the second area, the phosphor unit 103 has an area, i.e., a third area that reflects a portion of the excitation light and converts the other portion of the excitation light into fluorescence light having a fluorescence light different from a fluorescence light of the excitation light. A wavelength conversion member provided in the third area reflects the excitation light and convert a portion of the excitation light into the fluorescence light. The phosphor unit 103 may be referred to as a stationary phosphor unit. Once the excitation light is incident on the phosphor unit 103, the phosphor unit 103 emits the excitation light and the fluorescence light together to the incident-surface side (upward in FIG. 1A) on which the excitation light has been incident on the phosphor unit 103. In the configuration including the phosphor unit 103 described above, the same advantageous effect can be obtained as in the case in which the phosphor unit 103 operates in a time-division manner.

In some examples, the light-source device 100 in FIG. 1 may include a light guide configured to guide at least one of the excitation light and the fluorescence light emitted from the phosphor unit 103 to the rod integrator 104. For example, the light guide includes a condenser lens and a refractive lens and is arranged in an optical path between the phosphor unit 103 and the rod integrator 104. The light guide included in the light-source device 100 can efficiently guide at least one of the excitation light and the second colored light emitted from the phosphor unit 103 to the rod integrator 104 and can enhance the utilization efficiency of light.

Figure 2:
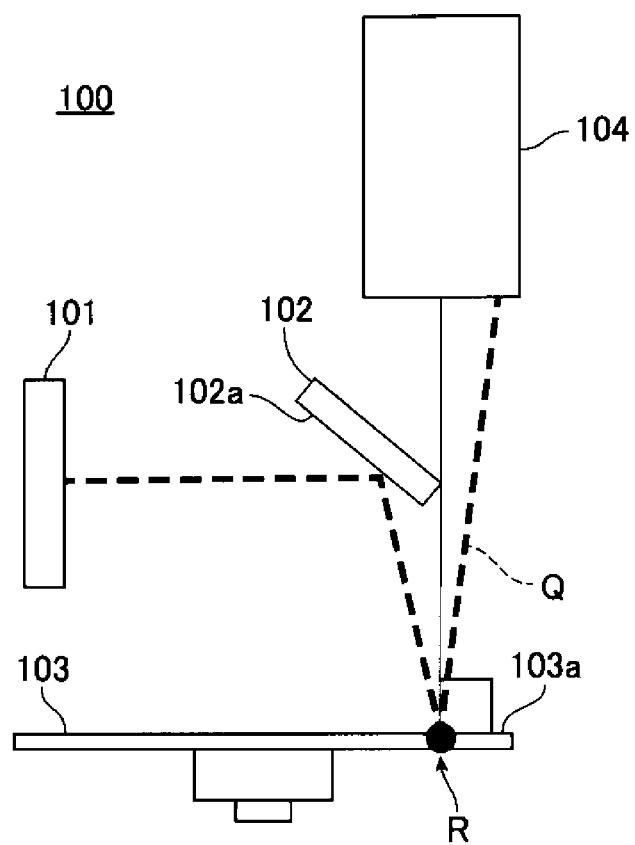
FIG. 2 is a schematic diagram of an optical arrangement of a light-source device according to another embodiment of the present disclosure.

In the light-source device 100 according to the present embodiment, the position of the rod integrator 104 can be appropriately changed in order to enhance the utilization efficiency of at least one of the incident excitation light and fluorescence light. FIG. 2 depicts a light-source device according to another embodiment of the present disclosure. In FIG. 2, the same components as the components of the embodiment illustrated in FIGS. 1A and 1B are denoted by the same reference numerals, and the description thereof is simplified. FIG. 2 depicts a case in which a reflecting surface 102a is formed on a surface of a dichroic mirror 102. The same applies to the drawings to be described below.

In the embodiment illustrated in FIG. 2, the center of a projection image of excitation light emitted from the dichroic mirror 102 and projected onto a phosphor unit 103 is designated as a point R. In this case, it is preferably that the rod integrator 104 is disposed on the line perpendicular to the point R on an exit surface 103a of the phosphor unit 103. With such an arrangement of the rod integrator 104, when the fluorescence light is emitted perpendicularly to the exit surface 103a of the phosphor unit 103, the fluorescence light can effectively be incident on the rod integrator 104. Thus, the utilization efficiency of the fluorescence light can be enhanced.

In the light-source device 100 according to the present embodiment, a light condensing element may be disposed on the optical path between the dichroic mirror 102 and the phosphor unit 103. The light condensing element condenses the excitation light reflected by the dichroic mirror 102 and substantially parallelizes the fluorescence light emitted from the phosphor unit 103. For example, the focusing element is a condenser lens.

Figure 3:
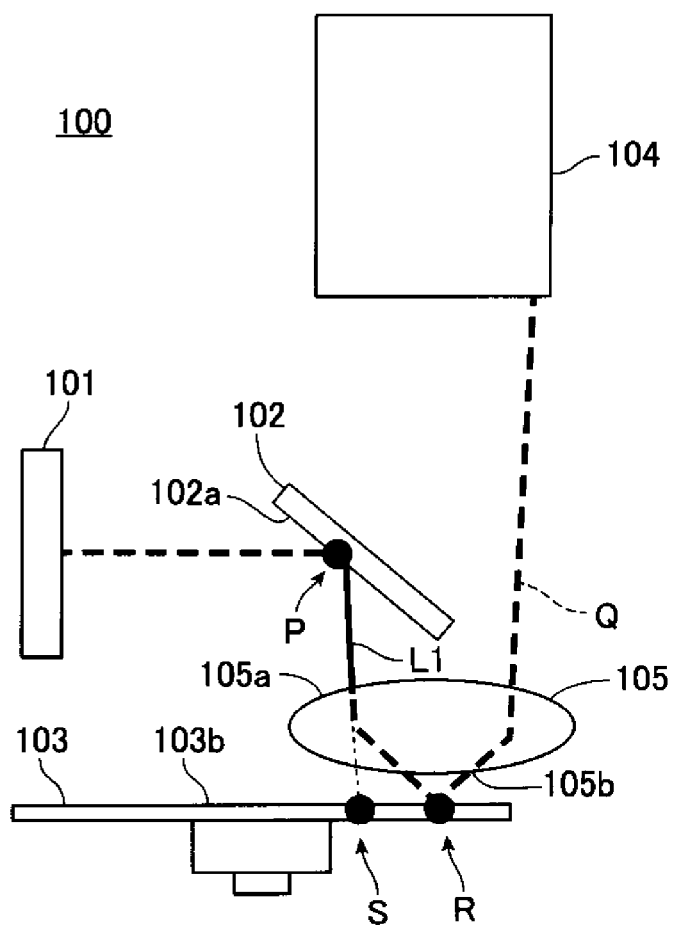
FIG. 3 is a schematic diagram of an optical arrangement of a light-source device according to still another embodiment of the present disclosure.

FIG. 3 depicts a light-source device according to still another embodiment of the present disclosure. In FIG. 3, the same reference numerals are given to the same components as the components of the embodiment illustrated in FIG. 1, and the description thereof is omitted. In the light-source device 100 illustrated in FIG. 3, a condenser lens 105 as the light condensing element is disposed in the optical path between the dichroic mirror 102 and the phosphor unit 103. The condenser lens 105 condenses the excitation light reflected by the dichroic mirror 102 and substantially parallelizes the fluorescence light emitted from the phosphor unit 103.

FIG. 3 indicates a straight line L1 connecting the above-described point P on the reflecting surface 102a and the center of the projection image on an incident surface 105a of the condenser lens 105. The projection image is projected on the incident surface 105a by the excitation light that has been reflected by the reflecting surface 102a of the dichroic mirror 102 and incident on the condenser lens 105. Further, FIG. 3 also indicates a point S that is a point of intersection of the straight line L1 and an incident surface 103b of the phosphor unit 103 on which the excitation light that has been condensed by the condenser lens 105 is incident. In the light-source device 100, the point S and the point R, which is the center of the projection image of the excitation light projected onto the phosphor unit 103, are disposed at different positions. With such an arrangement of the condenser lens 105, the excitation light and the fluorescence light, which are to be emitted from the phosphor unit 103 while diverging, can be collimated. Accordingly, the collimated excitation light and fluorescence light can be incident on the rod integrator 104 effectively, thus enhancing the utilization efficiency of light.

In the light-source device 100 illustrated in FIG. 3, the straight line L1 preferably intersects perpendicularly with the incident surface 103b of the phosphor unit 103. With such a configuration that the straight line L1 intersects perpendicularly with the incident surface 103b of the phosphor unit 103, the distance between the dichroic mirror 102 and the phosphor unit 103 can be reduced, and the size of the entire light-source device 100 can be reduced.

In the case where light passes through an optical element having a certain thickness, the incident surface is a surface on which the light is incident, and the exit surface is a surface from which the light is emitted. For example, in the condenser lens 105 illustrated in FIG. 3, a surface on which the reflection light from the reflecting surface 102a of the dichroic mirror 102 is incident is an incident surface 105a, and a surface on which the reflection light passes through the inside of the condenser lens 105 from the incident surface 105a and is emitted to the phosphor unit 103 side is an exit surface 105b.

Figure 4:
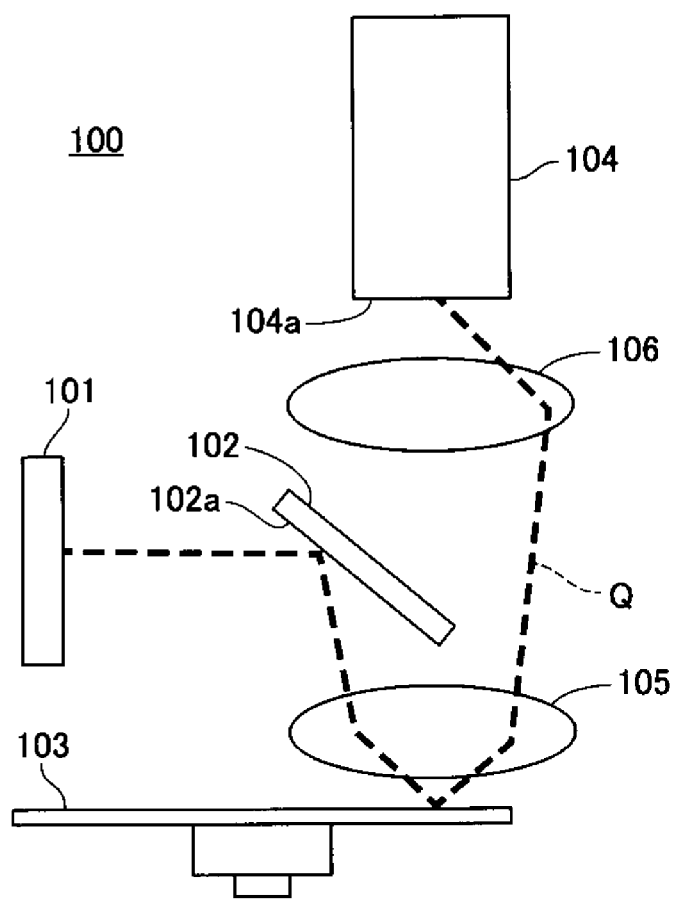
FIG. 4 is a schematic diagram of an optical arrangement of a light-source device according to still another embodiment of the present disclosure.

In the light-source device 100 according to the present embodiment, a refractive optical element may be disposed between the condenser lens 105 and the rod integrator 104. The refractive optical element condenses at least one of the excitation light and the fluorescence light collimated by the condenser lens 105, which is a light condensing element, and guides the condensed light to the rod integrator 104. The refractive optical element is, for example, a refractive lens. FIG. 4 depicts a light-source device 100 according to an embodiment of the present disclosure having such a configuration. In FIG. 4, the same reference numerals are given to the same components as the components of the embodiment illustrated in FIG. 3, and redundant description thereof is omitted.

In the light-source device 100 illustrated in FIG. 4, a refractive lens 106 as the refractive optical element is disposed in an optical path between a condenser lens 105 and a rod integrator 104. The refractive lens 106 refracts and condenses at least one of the excitation light and the fluorescence light collimated by the condenser lens 105, which is a light condensing element, and guide the condensed light to an incident aperture 104a of the rod integrator 104. With such an arrangement of the refractive lens 106, at least one of the excitation light and fluorescence light collimated by the condenser lens 105 can be effectively incident on the rod integrator 104, thus enhancing the utilization efficiency of light.

In the light-source device 100 illustrated in FIG. 4, it is preferable to select the arrangement position of the rod integrator 104 from the viewpoints of homogenization and uniformization of at least one of the excitation light and the fluorescence light incident on the rod integrator 104. For example, when the inner peripheral cross section of the rod integrator 104 is rectangular, the long side of an elliptical cross section of the excitation light incident on the rod integrator 104 may be arranged to correspond to the long side of the inner peripheral cross section of the rod integrator 104.

Further, in the light-source device 100 in FIG. 4, it is desired that the light source 101 be disposed to substantially prevent vignetting of the excitation light on the reflecting surface 102a of the dichroic mirror 102. For example, when the light-emitting surface of the light source 101 is rectangular, preferably, the light source 101 is disposed such that the width of the excitation light is narrower.

Figure 5A:
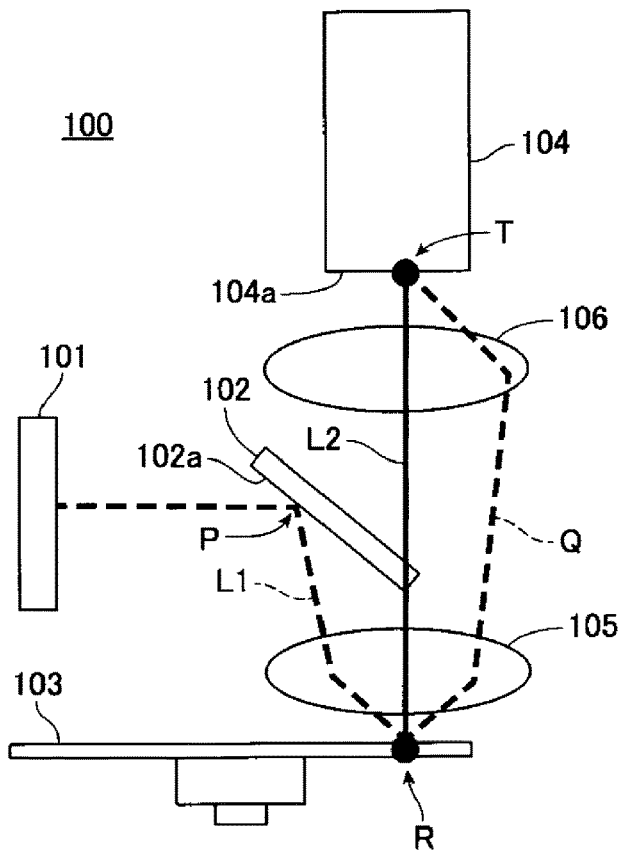
Figure 5B:
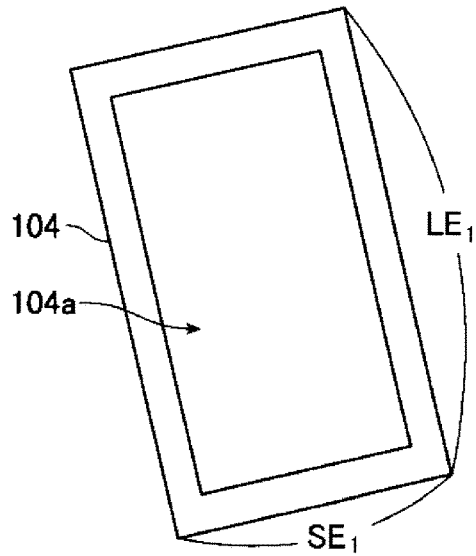
Figure 5C:
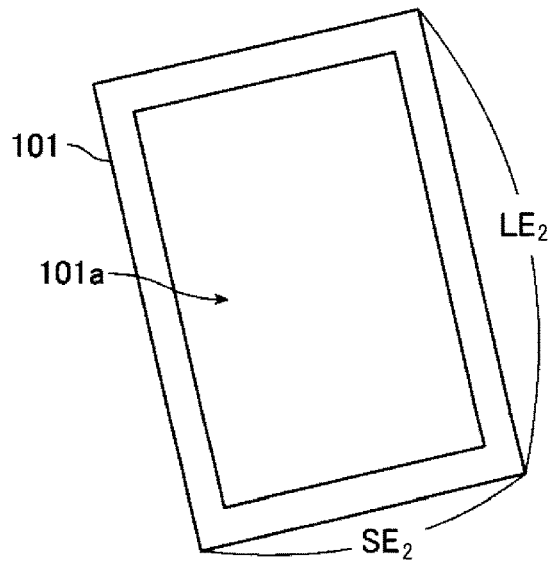

FIGS. 5A, 5B, and 5C depict a light-source device according to still another embodiment of the present disclosure. In FIGS. 5A, 5B, and 5C, the same reference numerals are given to the same components as the components of the embodiment illustrated in FIG. 4, and redundant description thereof is omitted. FIG. 5A depicts a light-source device 100 according to the present embodiment. FIG. 5B is an illustration of an incident aperture 104a of a rod integrator 104 included in the light-source device 100. FIG. 5C is an illustration of a light source 101 included in the light-source device 100. FIG. 5B is a view of the incident aperture 104a of the rod integrator 104 viewed from a phosphor unit 103 side. FIG. 5C is a view of a light-emitting surface of the light source 101 viewed from a dichroic mirror 102 side.

In the light-source device 100 illustrated in FIG. 5A, a point T is the center of a projection image projected on the incident aperture 104a of the rod integrator 104. The projection image is formed on the incident aperture 104a by at least one of the excitation light and the fluorescence light refracted and condensed by the refractive lens 106. A straight line L2 is a straight line connecting the point T and a point R that is the center of a projection image of the excitation light projected on the phosphor unit 103. As illustrated in FIG. 5B, the incident aperture 104a of the rod integrator 104 has a rectangular shape having a longer side $LE_1$ and a shorter side $SE_1$. Further, as illustrated in FIG. 5C, the light-emitting surface 101a of the light source 101 has a rectangular shape having a longer side $LE_2$ a shorter side $SE_2$.

In the light-source device 100, preferably, a plane including the straight line L1 and the straight line L2, in other words, a plane including a surface of the drawing sheet in which FIG. 5A is drawn is substantially parallel to the shorter side $SE_1$ of the incident aperture 104a of the rod integrator 104. In other words, the rod integrator 104 is arranged such that the shorter side $SE_1$ of the rod integrator 104 in FIG. 5B is parallel to the surface of the drawing sheet in which FIG. 5A is drawn. With such an arrangement of the rod integrator 104, the excitation light can strike on the inner surface corresponding to the longer side $LE_1$ of the incident aperture 104a of the rod integrator 104 so as to be incident on the rod integrator 104.

Accordingly, the number of reflection of the excitation light or the like within the rod integrator 104 is increased, and the excitation light or the like is homogenized, thus preventing unevenness in the color of the excitation light or the like.

In the light-source device 100, preferably, the plane including the straight line L1 and straight line L2, in other words, the plane including the surface of the drawing sheet in which FIG. 5A is drawn is substantially parallel to the shorter side $SE_2$ of the light-emitting surface 101a of the light source 101. In other words, the light source 101 is arranged such that the shorter side $SE_2$ of the light-emitting surface 101a in FIG. 5C is parallel to the surface of the drawing sheet in which FIG. 5A is drawn. With such an arrangement of the light source 101, the width of the light flux extending in a direction in which the plane including the straight line L1 and the straight line L2 extends can be reduced. Such a configuration can prevent vignetting on the reflecting surface 102a of the dichroic mirror 102 and a reduction in the utilization efficiency of light. Such a configuration also can prevent the light reflected by the phosphor unit 103 from interfering with the dichroic mirror 102 and restrain a reduction in the utilization efficiency of light.

In the light-source device 100 according to an embodiment of the present disclosure, it is desired that the rod integrator 104 be disposed according to the relative positions of the refractive lens 106 and the rod integrator 104. For example, it is preferable that the center of an image projected onto the incident aperture 104a of the rod integrator 104, the center of an image of fluorescence light projected onto the incident aperture 104a of the rod integrator 104, and the optical axes of the refractive lens 106 intersect at one point.

Figure 6B:
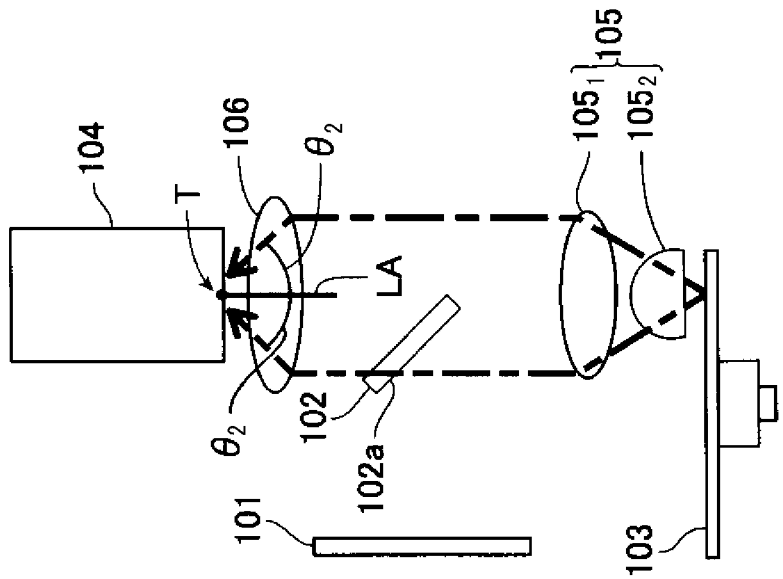
Figure 6A:
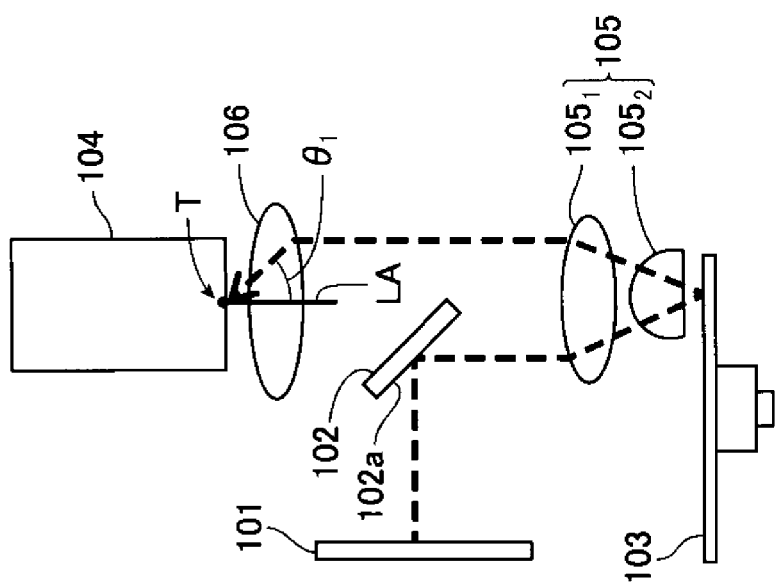

FIGS. 6A and 6B depict an outline of a light-source device 100 according to still another embodiment of the present disclosure. In FIGS. 6A and 6B, the same reference numerals are given to the same components as the components of the embodiment illustrated in FIGS. 5A, 5B, and 5C, and redundant description thereof is omitted. FIG. 6A depicts the optical path of excitation light in the light-source device 100. FIG. 6B depicts the optical path of fluorescence light in the light-source device 100. FIGS. 6A and 6B also depict a pair of condenser lenses $105_1$ and $105_2$ arranged along a propagation direction of light, for convenience of illustration.

In the light-source device 100 illustrated in FIGS. 6A and 6B, the center of a projection image projected on an incident aperture 104a of a rod integrator 104 by at least one of the excitation light and the fluorescence light condensed by a refractive lens 106 is the above-described point T. Further, the refractive lens 106 is arranged so that the optical axis LA of the refractive lens 106 passes through the point T. Accordingly, the center of the projection image of the excitation light and the fluorescence light projected on the incident aperture 104a of the rod integrator 104 intersect at one point with the optical axis LA of the refractive lens 106. Such an arrangement allows the excitation light and the fluorescence light to be incident on the center of the incident aperture 104a of the rod integrator 104, and thus restrain the occurrence of the vignetting on the incident aperture 104a of the rod integrator 104. As a result, the utilization efficiency of light can be enhanced. In addition, a reduction in the utilization efficiency of light, caused by misalignment of the optical elements within the light-source device 100 due to component tolerances, can also be restrained.

The arrangement of the refractive lens 106 in the light-source device 100 according to the present embodiment is preferably selected from the viewpoint of setting the angles of the excitation light and the fluorescence light incident on the incident aperture 104a of the rod integrator 104 within a certain range. Note that the angle of the light ray with respect to the incident aperture 104a refers to an angle between the light ray and the normal line of a plane parallel to the incident aperture 104a. For example, in the light-source device 100, the maximum incident angle of a light ray of the excitation light with respect to the incident aperture 104a is smaller than the maximum incident angle of a light ray of the fluorescence light with respect to the incident aperture 104a.

As illustrated in FIG. 6A, an angle $\theta_1$ is the maximum incident angle of the light ray of the excitation light with respect to the incident aperture 104a. As illustrated in FIG. 6B, an angle $\theta_2$ is the maximum incident angle of the light ray of the fluorescence light with respect to the incident aperture 104a. In the light-source device 100, it is desired that the angle $\theta_1$ be set smaller than the angle $\theta_2$. Setting the incident angle $\theta_1$ of the excitation light smaller than the incident angle $\theta_2$ of the fluorescence light can restrain the occurrence of vignetting in an optical system arranged downstream of the light-source device 100 and thus enhance the utilization efficiency of light.

In the light-source device 100 according to an embodiment of the present disclosure, the incident angle $\theta_1$ of the excitation light and the incident angle $\theta_2$ of the fluorescence light may be set equal to each other. Setting the incident angle $\theta_1$ of the excitation light equal to the incident angle $\theta_2$ of the fluorescence light allows the distribution of the excitation light projected on the DMD or the screen to be substantially the same as the distribution of the fluorescence light projected on the DMD or the screen. Accordingly, the unevenness in the color of the excitation light or the like can be restrained.

In the light-source device 100 according to the present embodiment, the optical properties of the rod integrator 104 is preferably selected according to the relation of the incident angle $\theta_1$ of the excitation light and the incident angle $\theta_2$ of the fluorescence light. For example, it is preferable that the rod integrator 104 of the light-source device 100 is formed of a glass rod integrator, and the total reflection condition is set to be larger than the incident angle $\theta_1$ of the excitation light and the incident angle $\theta_2$ of the second color light.

Figure 7:
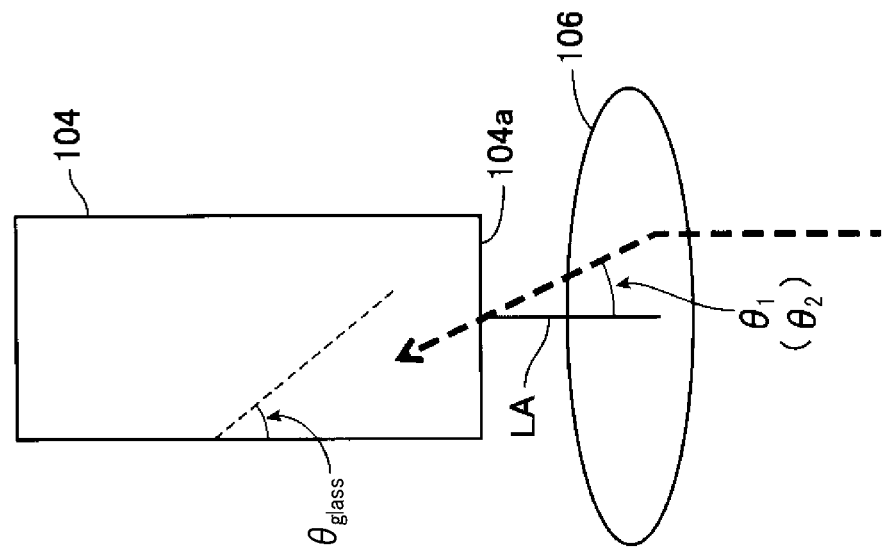
FIG. 7 is a schematic view of optical characteristics of a rod integrator according to an embodiment of the present disclosure.

The optical characteristics of the rod integrator 104 included in the light-source device 100 according to the present embodiment are described with reference to FIG. 7. In FIG. 7, the rod integrator 104 is a glass rod integrator. The total reflection condition in the rod integrator 104 is assumed to be an angle $\theta_{glass}$. In this case, the angle $\theta_{glass}$ is set to be larger than the incident angle $\theta_1$ of the excitation light and the incident angle $\theta_2$ of the fluorescence light. Such a configuration can prevent the loss of the excitation light and the like inside the rod integrator 104, thus enhancing the utilization efficiency of light.

Figure 8:
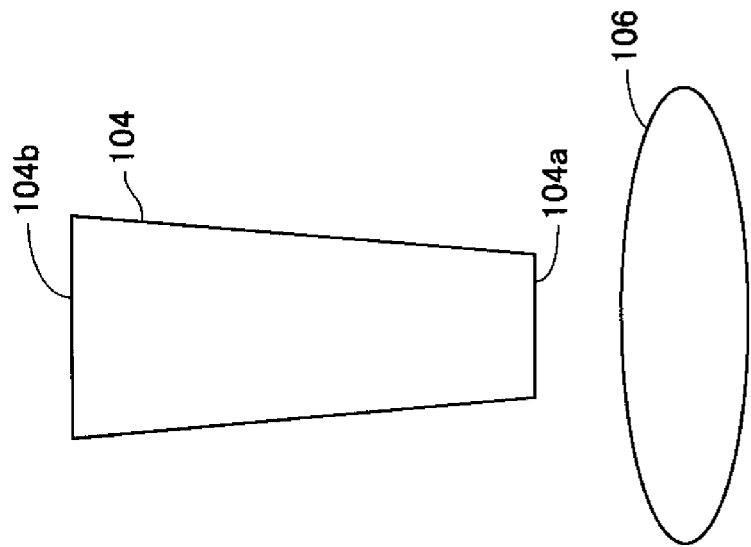
FIG. 8 is a schematic view of a rod integrator according to another embodiment of the present disclosure.

In the light-source device 100 according to the present embodiment, the rod integrator 104 constituting a light mixing element preferably has a tapered shape in which the incident aperture 104a is smaller than the exit aperture 104b, as illustrated in FIG. 8. When the rod integrator 104 has a tapered shape as described above, the emission angle of light from the rod integrator 104 is set to be small. Such a configuration can restrain vignetting of light in the optical system in the subsequent stage of the light-source device 100, thus enhancing the utilization efficiency of light.

Next, a description is given of a light-source optical system, a light-source device, and an image projection apparatus according to some embodiments of the present disclosure. A light-source optical system, a light-source device, and an image projection apparatus according to some embodiments of the present disclosure are examples of embodiments of the present disclosure, and can be appropriately changed. Further, the respective embodiments may be combined where appropriate.

First Embodiment

Figure 9:
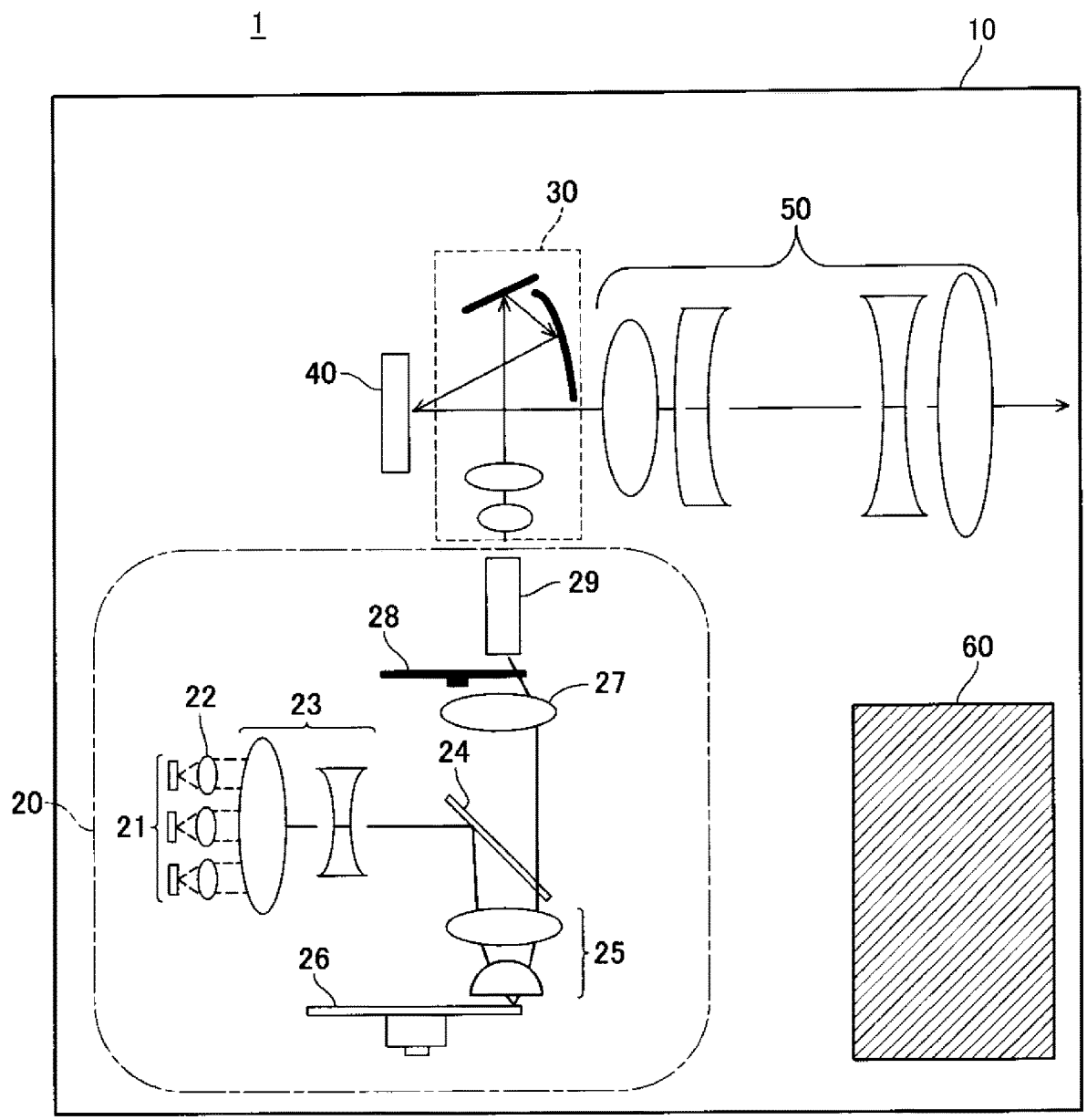
FIG. 9 is a schematic diagram of an optical arrangement of a light-source device according to a first embodiment of the present disclosure and a projector including the light-source device, according to an embodiment of the present disclosure.

FIG. 9 is a schematic diagram of the configuration of a projector 1, which is also referred to as image projection apparatus, including a light-source device 20 according to a first embodiment of the present disclosure. As illustrated in FIG. 9, the projector 1 includes a housing 10, a light-source device 20, an illumination optical system 30, an image forming element (or image display element) 40, a projection optical system 50, and a cooling device 60.

The housing 10 houses the light-source device 20, the illumination optical system 30, the image forming element 40, the projection optical system 50, and the cooling device 60. The light-source device 20 emits, for example, light beams having wavelengths corresponding to colors of RGB. An inner configuration of the light-source device 20 is described later in detail.

The illumination optical system 30 illuminates the image forming element 40 substantially uniformly with the light uniformized by a light tunnel 29, which is described later, included in the light-source device 20. The illumination optical system 30 includes, for example, one or more lenses and one or more reflecting surfaces.

The image forming element 40 forms an image by modulating the light illuminated by the illumination optical system 30, in other words, the light from the light-source optical system of the light-source device 20. The image forming element 40 includes, for example, a digital micromirror device (DMD) or a liquid crystal display element. The image forming element 40 drives the minute mirror surface in synchronization with blue light, green light, red light, and yellow light emitted from the illumination optical system 30, and generates a color image.

The projection optical system 50 magnifies and projects the color image formed by the image forming element 40 onto a screen, in other words, a projection surface. The projection optical system 50 includes, for example, at least one lens. The cooling device 60 cools each of the elements and devices that take heat in the projector 1.

Figure 10B:
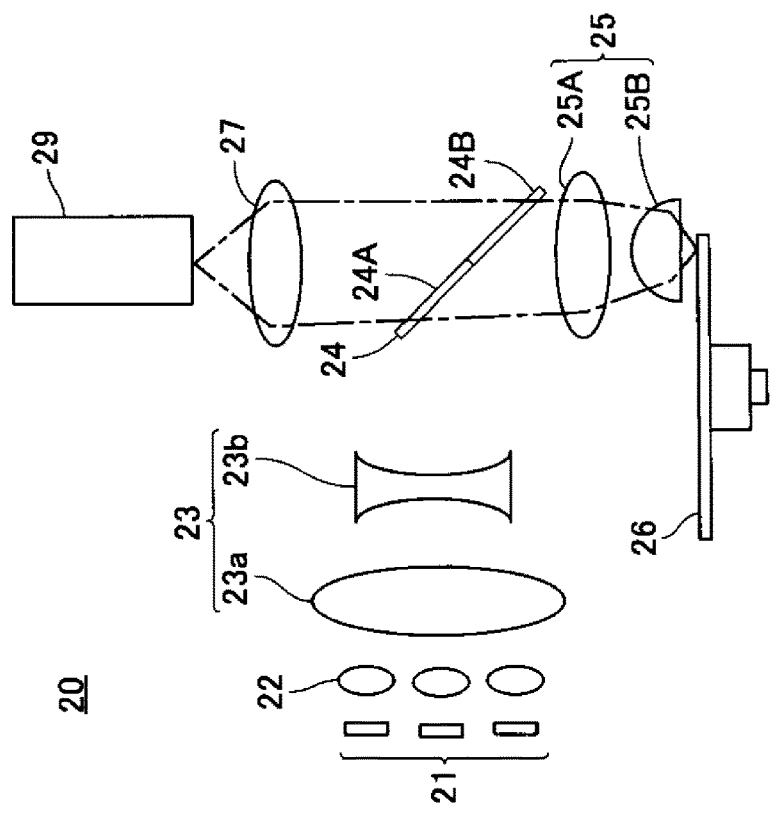
Figure 10A:
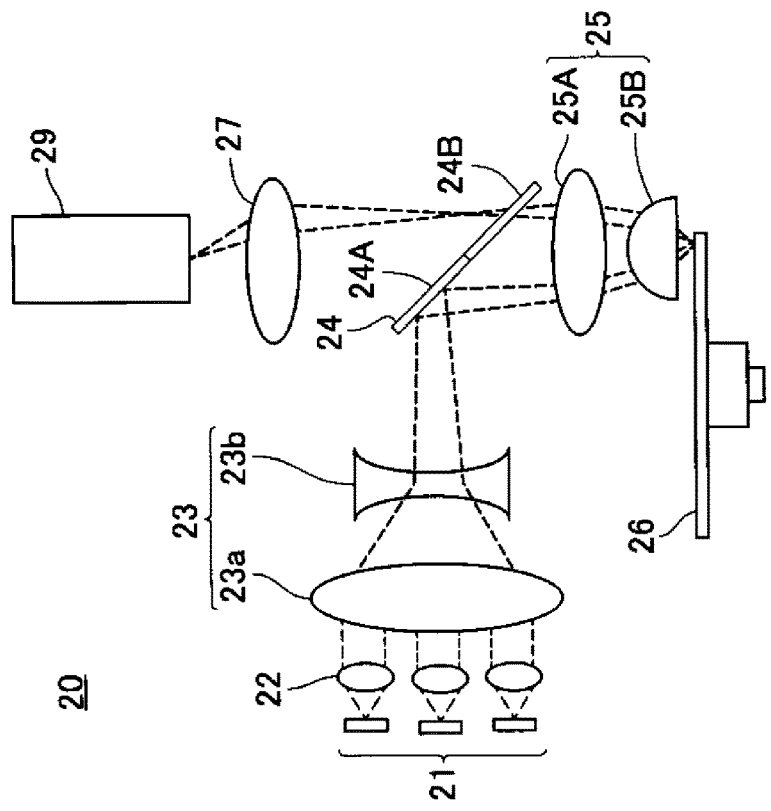

FIGS. 10A and 10B depict the light-source device 20 according to the first embodiment. FIG. 10A depicts the optical path of a blue laser beam in the light-source device 20. FIG. 10B depicts the optical path of fluorescence light in the light-source device 20.

As illustrated in FIG. 10A, the light-source device 20 includes a laser source (excitation light source) 21, a coupling lens 22, a first optical system 23, and a dichroic mirror 24 that is an example of an optical element, which are sequentially arranged in the propagation direction of light. The light-source device 20 further includes a second optical system 25, a phosphor unit 26 as an example of the wavelength conversion unit, a refractive optical system 27, a color wheel 28, and a light tunnel 29 as an example of the light mixing element.

In FIG. 10, the color wheel 28 is omitted for convenience of illustration. As illustrated in FIG. 9, the color wheel 28 is disposed between the refractive optical system 27 and the light tunnel 29. As illustrated in FIG. 9, in the present embodiment, the color wheel 28 is described as a component of the light-source device 20. However, the configuration of the light-source device 20 is not limited to the above-described configuration, and the color wheel 28 may not be included in the light-source device 20.

As illustrated in FIGS. 10A and 10B, in the laser source 21, for example, a plurality of light sources are arranged in array to emit a plurality of laser beams. The laser source 21 emits, for example, light (i.e., blue laser beam) in a blue band where the center wavelength of emission intensity is 455 nm. Hereinafter, the blue laser beam is referred to simply as blue light. The blue light emitted from the laser source 21 is linearly polarized light whose polarization direction is a specific direction, and is also used as excitation light that is excited by fluorescent material or phosphor of the phosphor unit 26, which is to be described later.

The light emitted by the laser source 21 is not limited to light in the blue wavelength band and may be light with wavelengths that can excite the fluorescent material. Further, the laser source 21 has a plurality of light sources in the first embodiment, but is not limited thereto. In some examples, the laser source 21 may be configured by one light source. In addition, the laser source 21 may be configured as a plurality of light sources arranged in array on a substrate, but is not limited thereto, and may have another arrangement configuration.

The coupling lens 22 is a lens that receives blue light emitted from the laser source 21 and converts the blue light into parallel light, in other words, collimated light. In the following description, the term "parallel light" is not limited to light that is completely collimated, but includes substantially collimated light. The number of coupling lenses 22 may be correspond to the number of light sources of the laser source 21 and increased or decreased in accordance with an increase or a decrease in the number of light sources of the laser source 21.

In the light-source device 20 according to the present embodiment, the laser source 21 and the coupling lens 22 constitute a light source unit. For example, the laser source 21 is configured by a plurality of laser diodes arranged in rows and columns. The light source unit includes the laser diodes and the coupling lenses 22 arranged on the emission surface side of the laser diodes.

Figure 11:
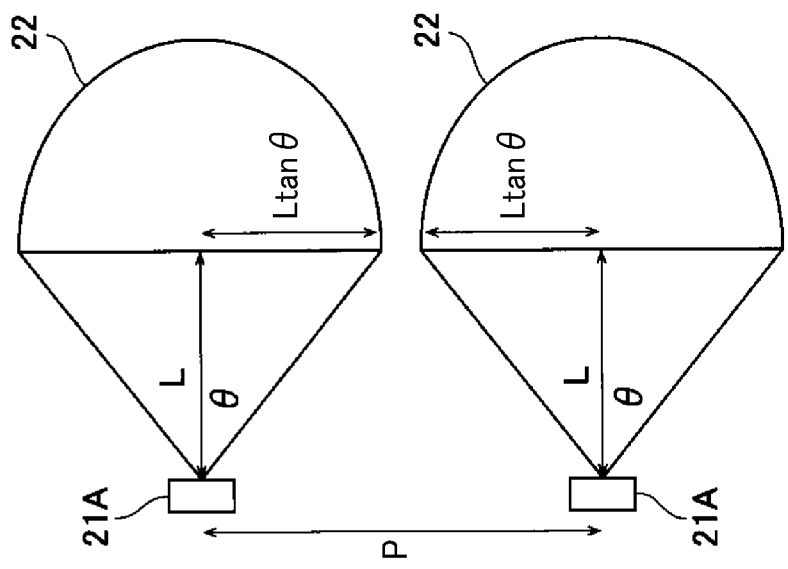
FIG. 11 is an illustration of a main part of a light source unit included in the light-source device according to the first embodiment.

FIG. 11 depicts a main part of the light source unit included in the light-source device 20 according to the first embodiment. In the light source unit illustrated in FIG. 11, each coupling lens 22 is arranged to face a laser diode 21A. In the light source unit, θ denotes a divergence angle of the blue light emitted from each laser diode 21A, the divergence angle being larger one between the row direction and the column direction. P denotes a pitch between adjacent laser diodes 21A, and L denotes a distance from a light-emitting point of a laser diode 21A to a corresponding coupling lens 22. The interval (P/Ltan θ) between the laser diodes 21A is configured to satisfy Formula (1) below:

$$1 \leq P/L \tan \theta \leq 4 \quad (1)$$

Most preferably, the interval between the laser diodes 21A is configured to satisfy Formula (2) below:

$$P/L \tan \theta = 2 \quad (2)$$

Satisfying Formula (2) enables the downsizing of the light-emission surface of the laser source 21, and also enables the light emitted from each laser diode 21A to be incident on only the corresponding one of the coupling lenses 22. Accordingly, the light emitted from each laser diode 21A is prevented from being erroneously incident on another coupling lens adjacent to the corresponding coupling lens. Thus, a decrease in the utilization efficiency of light can be restrained.

Note that the plurality of laser diodes 21A included in the light source unit are preferably arranged on the same substrate. With such an arrangement of the plurality of laser diodes 21A on the same substrate, the area of light emitted from the light source unit can be reduced. Accordingly, vignetting of light in various optical elements on the optical path can be restrained. Thus, the utilization efficiency of light can be enhanced.

In FIG. 9, the first optical system 23 has positive power as a whole, and includes a large-diameter lens 23a and a negative lens 23b in order from the laser source 21 side to the phosphor unit 26 side. The large-diameter lens 23a constitutes a large-diameter element and has positive power. The large-diameter lens 23a is a lens that converges and combines the collimated light beams emitted from the coupling lenses 22. The first optical system 23 including the large-diameter lens 23a and the negative lens 23b guides the light flux of the blue light, which has been substantially collimated by the coupling lens 22 and has been incident on the first optical system 23, to the dichroic mirror 24 while converging the light flux of the blue light.

The dichroic mirror 24 is arranged obliquely with respect to the propagation direction of the blue light emitted from the first optical system 23. Specifically, the front end side in the propagation direction of the blue light emitted from the first optical system 23 is inclined downward. The dichroic mirror 24 has an optical property that is capable of reflecting the blue light substantially collimated by the first optical system 23 and also capable of transmitting the fluorescence light, in other words, the second colored light converted by the phosphor unit 26. The dichroic mirror 24 is provided with optical coating having the above-described optical property.

Figure 12:
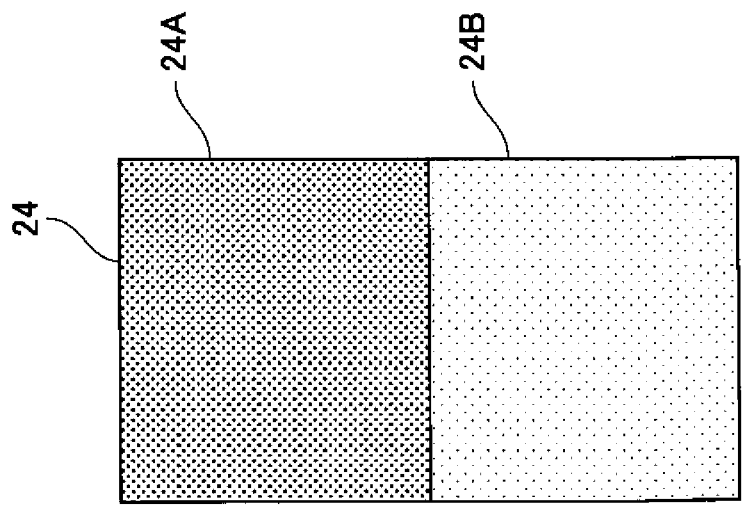
FIG. 12 is a front view of an example of the configuration of a dichroic mirror of the light-source device according to the first embodiment.

FIG. 12 depicts an example of the dichroic mirror 24 of the light-source device 20 according to the first embodiment. FIG. 12 depicts the dichroic mirror 24 as viewed from the incident direction of the blue light emitted from the first optical system 23 side. As illustrated in FIG. 12, the dichroic mirror 24 is divided into two regions 24A and 24B. Hereinafter, for convenience of description, the regions 24A and 24B are referred to as a first region 24A and a second region 24B, respectively.

The first region 24A has the optical property that reflects the blue light emitted from the negative lens 23b of the first optical system 23 while transmitting the fluorescence light converted from the blue light by the phosphor of the phosphor unit 26 to be described later. The first region 24A forms the reflecting surface 102a as illustrated in FIG. 1A. The second region 24B has an optical property capable of transmitting the blue light and the fluorescence light.

The first region 24A is disposed on the optical axis of the first optical system 23, but is not disposed on the optical axis of the second optical system 25, and is disposed in an attitude to approach the first optical system 23 side. On the other hand, the second region 24B is not disposed on the optical path of the second optical system 25, and is disposed so as to be farther from the first optical system 23 than the optical path of the second optical system 25.

The second optical system 25 has positive power as a whole, and includes a positive lens 25A and a positive lens 25B in order from the laser source 21 side to the phosphor unit 26 side. The second optical system 25 serves to converge the blue light reflected by the dichroic mirror 24 while guiding the blue light to the phosphor unit 26. Further, the second optical system 25 collimates the fluorescence light (the fluorescence) emitted from the phosphor unit 26. Note that the second optical system 25 is an example of the condensing element.

The blue light guided by the second optical system 25 is incident on the phosphor unit 26. The phosphor unit 26 is a switching unit to switch between a function of reflecting the blue light emitted from the second optical system 25 and a function of causing the blue light to act as excitation light and converting the blue light into fluorescence light having a wavelength range different from that of the blue light by the phosphor. The fluorescence light converted by the phosphor unit 26 is, for example, light in a yellow wavelength band where the center wavelength of the emission intensity is 550 nm.

Figure 13A:
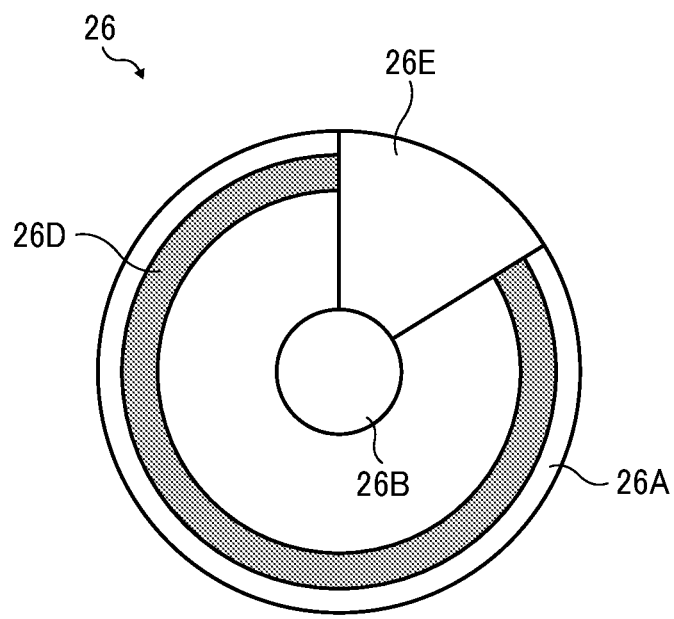
Figure 13B:
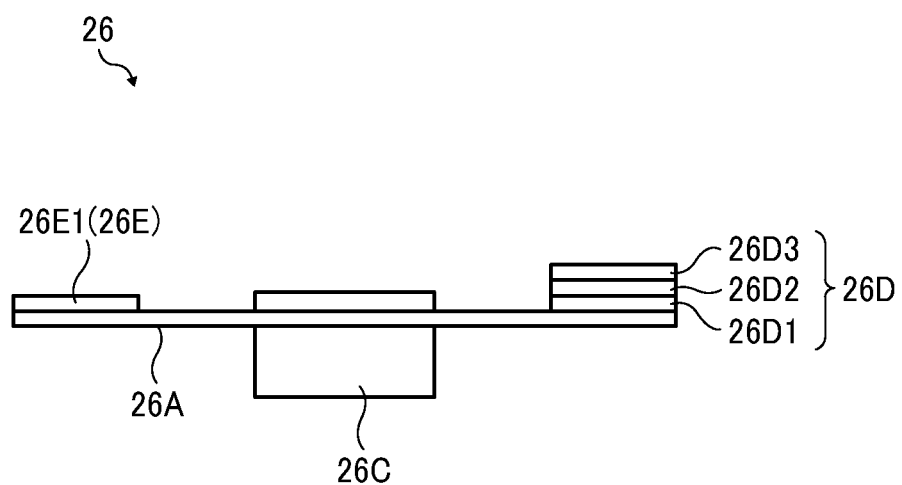

FIGS. 13A and 13B depict the phosphor unit 26 of the light-source device 20 according to the first embodiment. In FIG. 13A, the phosphor unit 26 is viewed from the incident direction of the blue light. In FIG. 13B, the phosphor unit 26 is viewed from the direction orthogonal to the incident direction of the blue light. The configuration of the phosphor unit 26 illustrated in FIGS. 13A and 13B is one example, and the configuration of the phosphor unit according to an embodiment of the present disclosure is not limited to the configuration of FIGS. 13A and 13B, and may be changed where appropriate.

As illustrated in FIGS. 13A and 13B, the phosphor unit 26 includes a disc member 26A serving as a substrate and a drive motor 26C serving as a drive unit. The drive motor 26C has a rotation shaft 26B on a straight line passing through the center of the disc member 26A and perpendicular to the plane of the disc member 26A. The material of the disc member 26A is not limited to a particular material, and may be any suitable material. For example, a transparent substrate or a metallic substrate such as aluminum can be used.

A larger portion of the disc member 26A in the circumferential direction of the phosphor unit 26, for example, an angular range larger than 270° in the first embodiment is assigned to a fluorescent region 26D. A small portion of the disc member 26A in the circumferential direction of the phosphor unit 26, for example, an angular range smaller than 90° in the first embodiment is assigned to an excitation-light reflective region 26E. The excitation-light reflective region 26E constitutes an example of a first region that reflects or diffusely reflects the excitation light reflected by the dichroic mirror 24. The fluorescent region 26D constitutes an example of an area that converts the excitation light reflected by the dichroic mirror 24 into fluorescence light (fluorescence) and emits the fluorescence light. The fluorescent region 26D includes a reflection coat 26D1, a phosphor layer 26D2, and an anti-reflection coat (AR coat) 26D3 layered in this order from a lower-layer side toward an upper-layer side.

The reflection coat 26D1 has a characteristic of reflecting light in a wavelength region of the fluorescence light emitted from the phosphor layer 26D2. When the disc member 26A is made of a metal substrate with high reflectivity, the reflection coat 26D1 may be omitted. In other words, the disc member 26A may have the function of the reflection coat 26D1.

The phosphor layer 26D2 may use, for example, a substance in which a fluorescent material is dispersed into an organic or inorganic binder, a substance in which a crystal of a fluorescent material is directly formed, or a rare-earth phosphor such as a Ce:YAG-based substance. The phosphor layer 26D2 forms an example of a wavelength conversion member that converts at least a portion of the excitation light into fluorescence light having a wavelength different from that of the excitation light and emits the fluorescence light. The wavelength bands of the fluorescence light emitted from the phosphor layer 26D2 may be, for example, yellow, blue, green, and red wavelength bands. In the first embodiment, fluorescence light having a yellow wavelength band is used. While the fluorescence material is used as the wavelength conversion element in this embodiment, a phosphorescent body or a non-linear optical crystal may be used.

The anti-reflection coat 26D3 has a characteristic of preventing reflection of light at a surface of the phosphor layer 26D2.

A reflection coat 26E1 having a characteristic of reflecting light in the wavelength region of the blue light guided from the second optical system 25 is layered on the excitation-light reflective region 26E. Therefore, the excitation-light reflective region 26E is a reflecting surface. When the disc member 26A is made of a metal substrate with high reflectivity, the reflection coat 26E1 may be omitted. In other words, the disc member 26A itself may have the function of the reflection coat 26E1.

When the disc member 26A is rotationally driven by the drive motor 26C while the phosphor unit 26 is irradiated with blue light (referred to as "first color light"), the irradiation position of the blue light with respect to the phosphor unit 26 moves with time. Accordingly, a portion of the blue light incident on the phosphor unit 26 is converted into fluorescence light (referred to as "second color light") having a wavelength different from the wavelength of the blue light in the fluorescent region 26D, which is a wavelength conversion region, and is emitted. The other portion of the blue light incident on the phosphor unit 26 is reflected by the excitation-light reflective region 26E without a change from the blue light. Here, "a portion of the blue light" and "the other portion of the blue light" mean a portion and the other portion divided on the time axis.

The number, range, and the like of the fluorescent region 26D and the excitation-light reflective region 26E have degrees of freedom, and various design changes can be made. For example, two fluorescent regions and two excitation-light reflective regions may be alternately arranged in the circumferential direction at intervals of 90°.

Returning to FIGS. 10A and 10B, the configuration of the light-source device 20 are further described. The refractive optical system 27 is a lens that condenses (converges) blue light and fluorescence light emitted from the second optical system 25. The light emitted from the phosphor unit 26 passes through the dichroic mirror 24, is refracted and condensed by the refractive optical system 27, and is incident on the color wheel 28 (see FIG. 9). The color wheel 28 separates the blue light and fluorescence light (fluorescence) generated by the phosphor unit 26 into desired colors.

Figure 14A:
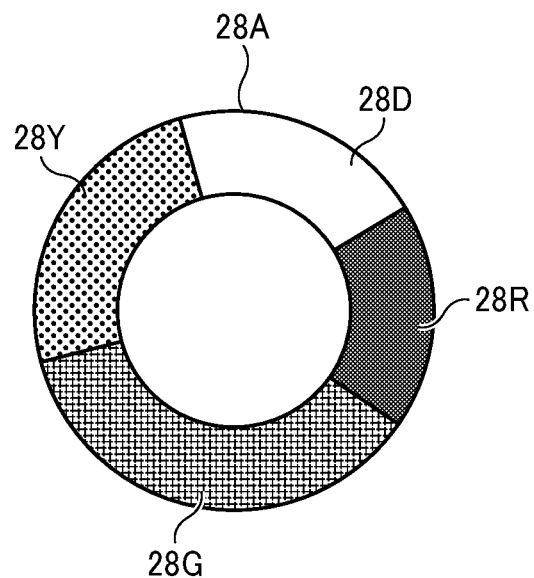
Figure 14B:
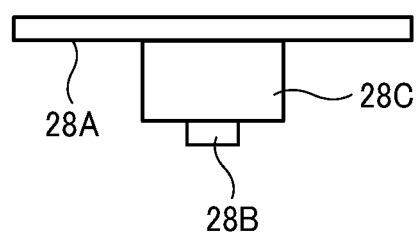

FIGS. 14A and 14B are illustrations of a schematic configuration of the color wheel 28 of the light-source device 20 according to the first embodiment. In FIG. 14A, the color wheel 28 is viewed from the incident direction of the blue light and the fluorescence light. In FIG. 14B, the color wheel 28 is viewed from the direction orthogonal to the incident direction of the blue light and the fluorescence light. As illustrated in FIG. 14B, the color wheel 28 includes an annular member 28A, a rotation shaft 28B, and a drive motor 28C as a drive unit that drives the annular member 28A to rotate about the rotation shaft 28B.

The annular member 28A includes a plurality of regions partitioned along the circumferential direction, in other words, a diffusion region 28D and three filter regions 28R, 28G, and 28Y.

The diffusion region 28D is a region that transmits and diffuses the blue light emitted from the phosphor unit 26. The filter region 28R is a region that transmits light having the wavelength range of the red component of the fluorescence light emitted from the phosphor unit 26. Similarly, the filter regions 28G and 28Y are regions that transmit light having the wavelength range of the green component and light having the wavelength range of the yellow component of the fluorescence light emitted from the phosphor unit 26, respectively.

In the above description, it is assumed that the color wheel 28 has regions through which the red, green, and yellow components of the fluorescence light are transmitted. However, the configuration of the color wheel 28 is not limited thereto. For example, the color wheel 28 may have regions through which a red component and a green component of the fluorescence light are transmitted.

The area ratio between the regions in the color wheel 28 is determined based on design specification of the projector 1. The blue light emitted from the phosphor unit 26 is transmitted through the diffusion region 28D of the color wheel 28. Therefore, the ratio of the area of the excitation-light reflective region 26E to the total area of the disc member 26A of the phosphor unit 26 and the ratio of the area of the diffusion region 28D to the total area of the color wheel 28 preferably coincide with each other.

The drive motor 28C rotationally drives the annular member 28A in the circumferential direction. When the annular member 28A rotates in the circumferential direction, the blue light emitted from the phosphor unit 26 sequentially enters the diffusion region 28D and the filter regions 28R, 28G, and 28Y. The blue light and the fluorescence light emitted from the phosphor unit 26 is transmitted through the color wheel 28, so that the blue light, green light, red light, and yellow light are sequentially emitted from the color wheel 28. The light transmitted through each region of the color wheel 28 is then incident on the light tunnel 29.

The light tunnel 29 is an optical element in which four mirrors form inner surfaces of a quadrangular prism. The light tunnel 29 serves as a light mixing element to cause the light incident on one end of the quadrangular prism to be reflected plural times by the inner mirrors so as to make the distribution of the light uniform. The light tunnel 29 is disposed to enable the blue light and fluorescence light condensed by the refractive optical system 27 to be incident on the light tunnel 29. In the first embodiment, the light tunnel 29 is used as an example of the light mixing element. However, no limitation is intended thereby. Alternatively, the light tunnel 29 may be, for example, the above-described rod integrator or a fly-eye lens.

Figure 15A:
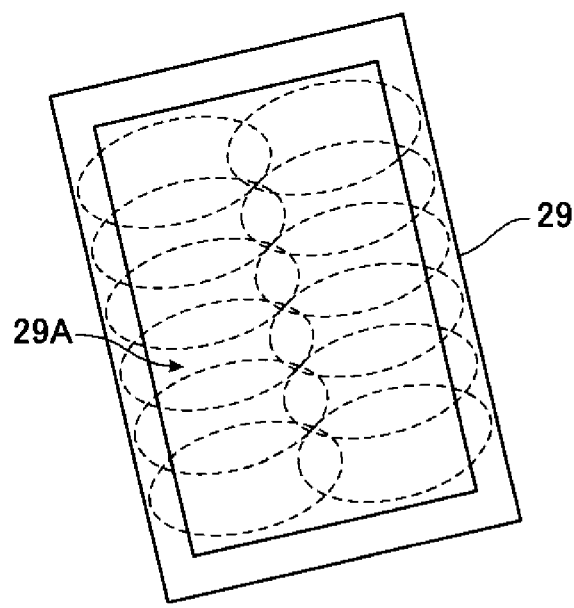
Figure 15B:
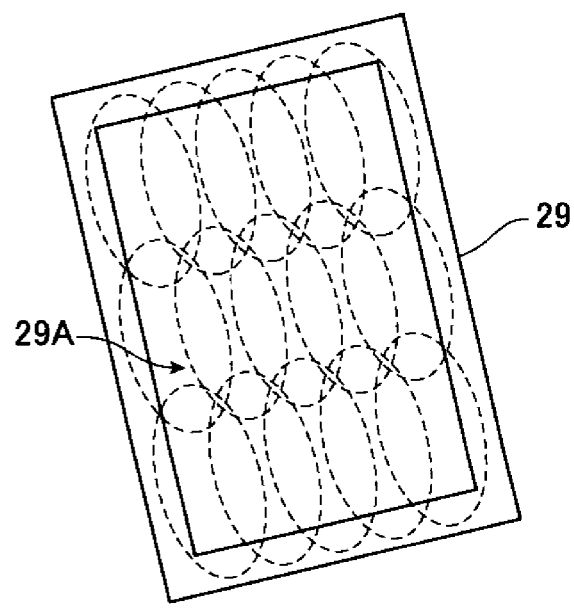

FIGS. 15A and 15B depicts two examples of an incident aperture 29A of the light tunnel 29 in the light-source device 20 according to the first embodiment, as viewed from the incident direction of light. FIGS. 15A and 15B each indicates projection areas of the blue light projected onto the incident aperture 29A of the light tunnel 29. The light tunnel 29 is arranged slightly tilted as illustrated in FIGS. 15A and 15B. The tilt angle of the light tunnel 29 is determined depending on a desired performance of the light-source device 20.

As described above, the light source unit of the light-source device 20 according to the first embodiment includes the laser source 21 in which the laser diodes 21A are arranged in array.

As illustrated in FIGS. 15A and 15B, the projection cross section of the blue light or the like emitted from the laser diode 21A and projected onto the incident aperture 29A of the light tunnel 29 is elliptical. In the example illustrated in FIG. 15A, the long axes of the elliptical projection cross sections of the blue light and the like projected on the incident aperture 29A are arranged to be substantially parallel to the short sides of the incident aperture 29A. With such an arrangement of the projection areas of the blue light or the like on the incident aperture 29A, the occurrence of the vignetting of the blue light or the like in the light tunnel 29 can be prevented.

As illustrated in FIG. 15B, the projection areas of the blue light or the like on the incident aperture 29A may be arranged such that the major axes of the elliptical projection cross sections are substantially parallel to the long sides of the incident aperture 29A. In the present embodiment, the elliptical shape refers to a shape having a difference between the full width at half maximum (FWHM) of the intensity distribution in the vertical direction of the projection area and the full width at half maximum (FWHM) of the intensity distribution in the horizontal direction. In other words, the elliptical shape is a shape without an isotropic intensity distribution.

The optical path of the blue light (hereinafter referred to as blue light optical path) in the light-source device 20 having such a configuration is described below. The blue light path is an optical path of some light rays of the excitation light emitted from the laser source 21 illustrated in FIGS. 10A and 10B. The light rays are reflected by the excitation-light reflective region 26E (see FIG. 13A) of the phosphor unit 26.

The blue light emitted from the laser source 21 is converted by the coupling lens 22 into parallel light. The blue light emitted from the coupling lens 22 is condensed and combined by the large-diameter lens 23a of the first optical system 23, and is then incident on the dichroic mirror 24 as condensed light through the negative lens 23b. The dichroic mirror 24 reflects the incident light in the first region 24A, and the reflected light is directed to the second optical system 25. The first region 24A constitutes the reflecting surface 102a that reflects the blue light emitted from the laser source 21 (see FIGS. 1A and 1B). The point P at the center of the projection image of the excitation light described above is formed in the first region 24A.

As described above, the first region 24A of the dichroic mirror 24 is disposed closer to the first optical system 23 relative to the optical axis of the second optical system 25. With this arrangement, the blue light path is incident on a portion of the second optical system 25, specifically, a portion of the positive lens 25A on the side closer to the first optical system 23. The blue light travels so as to approach the optical axis of the second optical system 25 while forming an angle with respect to the optical axis of the second optical system 25 and is emitted from the second optical system 25, specifically, the positive lens 25B. The blue light emitted from the second optical system 25 is incident on the phosphor unit 26.

When the blue light traveling toward the phosphor unit 26 is incident on the excitation-light reflective region 26E, the blue light is regularly reflected by the excitation-light reflective region 26E. The blue light regularly reflected by the excitation-light reflective region 26E is incident on the second optical system 25, specifically, a portion of the positive lens 25B on the side opposite to the side closer to the first optical system 23. Then, the blue light travels away from the optical axis of the second optical system 25 while forming an angle with respect to the optical axis of the second optical system 25 and is emitted from the second optical system 25, specifically, the positive lens 25A.

The blue light emitted from the positive lens 25A of the second optical system 25 passes through the second region 24B of the dichroic mirror 24. The light flux of the blue light regularly reflected by the phosphor unit 26 or the light flux of the blue light emitted from the second optical system 25 and transmitted through the second region 24B of the dichroic mirror 24 constitutes the above-described light flux Q of the excitation light. As described above, the second region 24B of the dichroic mirror 24 has an optical property that transmits the excitation light and the fluorescence light. Such a configuration can restrain a decrease in the utilization efficiency of light even when the light flux (light flux Q) of the blue light intersects with the dichroic mirror 24.

The blue light transmitted through the second region 24B of the dichroic mirror 24 is incident on the refractive optical system 27. The blue light travels so as to approach the optical axis of the refractive optical system 27 while forming an angle with respect to the optical axis of the refractive optical system 27 and is incident on the light tunnel 29 through the color wheel 28 illustrated in FIG. 9. The blue light is reflected plural times inside the light tunnel 29 and homogenized (made uniform), and is then incident on the illumination optical system 30 outside the light-source device 20.

Next, the optical path of the fluorescence light (hereinafter, appropriately referred to as a fluorescence light path) in the light-source device 20 is described according to the present embodiment with reference to FIG. 10B. In FIG. 10B, a part of the optical path of the fluorescence light is omitted for convenience of illustration. The fluorescence light path is an optical path of some other light rays of the excitation light emitted from the laser source 21, the wavelength of some other light rays to be converted by the fluorescent region 26D of the phosphor unit 26.

Until the blue light emitted from the laser source 21 is guided to the phosphor unit 26, the fluorescence light path is identical with the blue light path described above. In this case, it is assumed that the blue light incident on the phosphor unit 26 is incident on the fluorescent region 26D. The blue light incident on the fluorescent region 26D serves as excitation light for the phosphor. The phosphor converts the wavelength of the blue light so that the fluorescence light including, for example, a yellow wavelength band is generated and the fluorescence light is reflected by the reflection coat 26D1 and the phosphor layer 26D2 to thus exhibit Lambertian reflectance.

The fluorescence light Lambertian-reflected by the fluorescent region 26D is converted by the second optical system 25 into parallel light. The fluorescence light emitted from the second optical system 25 passes through the dichroic mirror 24 and is incident on the refractive optical system 27. The fluorescence light advances so as to approach the optical axis of the refractive optical system 27 while forming an angle with respect to the optical axis of the refractive optical system 27, and is incident on the light tunnel 29 through the color wheel 28. The fluorescence light is reflected plural times inside the light tunnel 29 and homogenized (made uniform), and is then incident on the illumination optical system 30 outside the light-source device 20.

As described above, in the light-source device 20 according to the first embodiment, the optical path of the blue light emitted from the laser source 21 differs between before and after the reflection by the phosphor unit 26. More specific description is as follows. A point of the center of a projection image of the blue light projected on the first region 24A of the dichroic mirror 24 from the laser source 21 is determined. The point of the center of the projection image is indicated by the point P in FIG. 1A. The blue light path is formed so as to prevent the point P from intersecting with the light flux (light flux Q in FIG. 1A) of the blue light reflected from the phosphor unit 26. Such a configuration can prevent the blue light from passing through the same portion on the dichroic mirror 24, prevent the dichroic mirror 24 from being damaged due to an increase in light condensing density, and enhance reliability.

Such a configuration can also obviate the necessity of a particular optical element a polarization splitter formed of, e.g., a phase-contrast plate or a polarization beam splitter to separate the optical path of the blue light emitted from the phosphor unit 26, from the other optical path. Accordingly, the number of components and the cost for producing the device can be reduced, thus achieving a reduction in the size of the light-source device 20. Further, since optical components such as a phase-contrast plate and a polarization splitter are not used to operate the polarization of light, a decrease in the utilization efficiency of light due to the reflectivity, transparency, and absorptance of the optical components can be substantially prevented.

In the light-source device 20 according to the first embodiment, the blue light emitted from the laser source 21 is a linearly polarized laser beam whose polarization direction is a specific direction. The light source units including the plurality of laser sources 21 are arranged so that the directions of the linearly polarized light are all the same, and the directions of the linearly polarized light of the light emitted from the light source units are aligned. The direction of each linearly polarized laser beam can be determined by the direction in which the light source unit is arranged.

As illustrated in FIGS. 15A and 15B, if the light source unit is tilted according to the tilt of the light tunnel 29, the direction of each linearly polarized laser beam varies. In such a situation where the direction of the linearly polarized laser beam varies, if the polarization of light is controlled by using, for example, a polarization splitter, the utilization efficiency of light might decrease when the light passes through the polarization splitter. Since the polarization of light is not controlled in the light-source device 20 according to the first embodiment, the decrease in the utilization efficiency of light due to the tilt of the laser source 21 can be prevented.

Second Embodiment

Figure 16A:
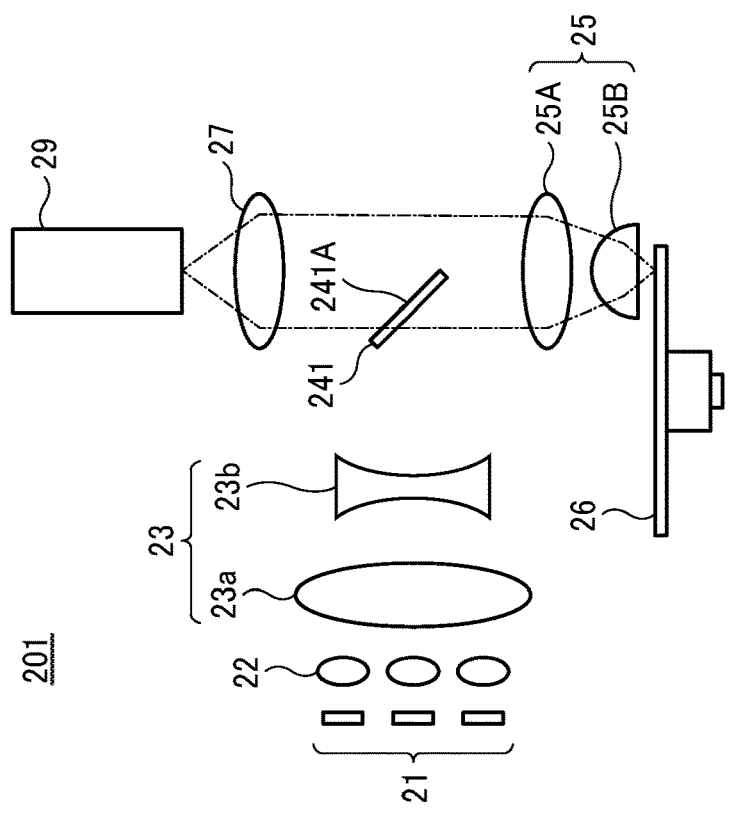
Figure 16B:
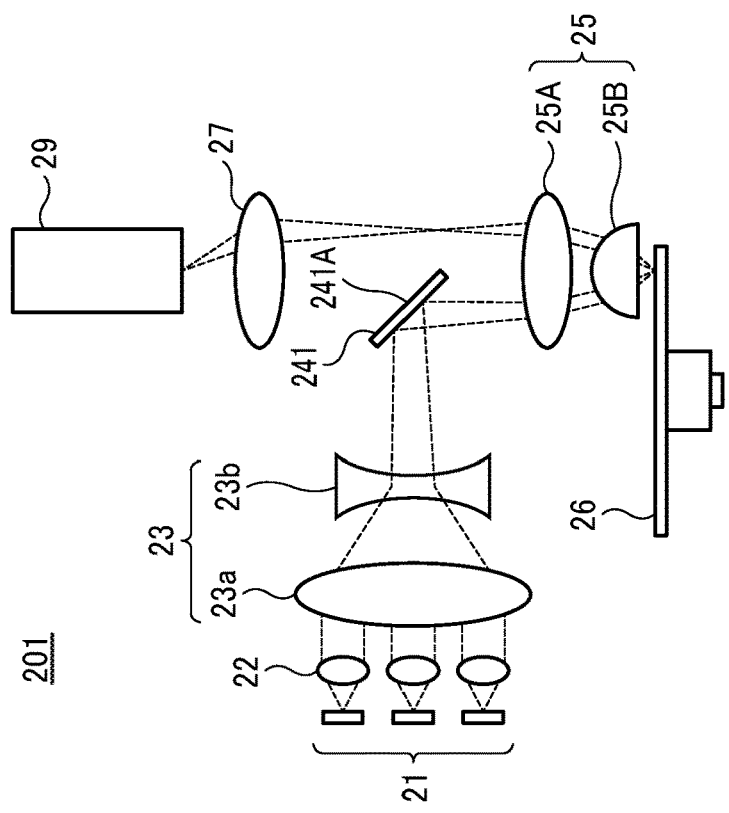

A light-source device 201 according to a second embodiment differs in the configuration of the dichroic mirror from the light-source device 20 according to the first embodiment. Hereinafter, the configuration of the light-source device 201 according to the second embodiment illustrated in FIGS. 16A and 16B is described below, focusing on differences from the light-source device 20 according to the first embodiment. FIG. 16A depicts the optical path of the blue light in the light-source device 201. FIG. 16B depicts the optical path of the fluorescence light in the light-source device 201. In FIGS. 16A and 16B, the same reference numerals are given to the same components as the components of the first embodiment, and redundant description thereof is omitted. In FIG. 16B, a part of the optical path of the fluorescence light is omitted for convenience of illustration.

A light-source device 201 illustrated in FIGS. 16A and 16B is different from the light-source device 20 according to the first embodiment only in the configuration of a dichroic mirror 241. The dichroic mirror 241 is arranged to be tilted in the same manner as in the dichroic mirror 24. However, the dichroic mirror 241 has a shorter length than the dichroic mirror 24. Since the dichroic mirror 24 have a shorter length, the size of the light-source device 20 can be reduced. The dichroic mirror 241 has the same optical properties as the first region 24A that is a part of the dichroic mirror 24 described above.

Figure 17:
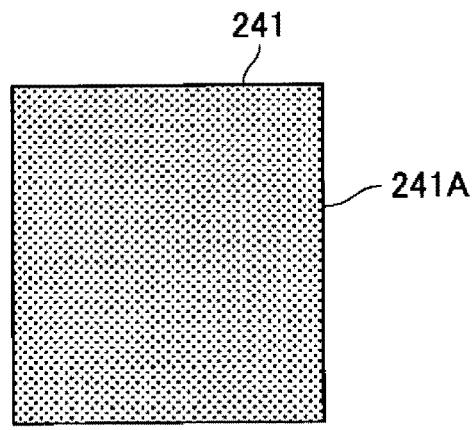
FIG. 17 is a front view of an example of a configuration of a dichroic mirror applicable to the light-source device according to the second embodiment.

FIG. 17 depicts an example of the configuration of the dichroic mirror 241 of the light-source device 201 according to the second embodiment. FIG. 17 depicts the dichroic mirror 241 as viewed from the incident direction of the blue light (excitation light) emitted from the first optical system 23 side. The dichroic mirror 241 is formed of only a single region 241A.

Similarly to the first region 24A according to the second embodiment, the region 241A has the optical property that reflects the blue light emitted from the first optical system 23 while transmitting the fluorescence light converted from the blue light by the phosphor of the phosphor unit 26. The region 241A is disposed at the same position as the first region 24A. In other words, the region 241A is disposed on the optical path of the first optical system 23. However, the region 241A is disposed at a position shifted from the optical axis of the second optical system 25 toward the first optical system 23.

The blue light path and the fluorescence light path in the light-source device 201 having such a configuration is described with reference to FIGS. 16A and 16B. As illustrated in FIG. 16A, the blue light emitted from the laser source 21 is reflected by the excitation-light reflective region 26E of the phosphor unit 26 and emitted to the second optical system 25. Up to this point, the blue light optical path is the same as that of the first embodiment. In the light-source device 201 according to the second embodiment, the blue light emitted from the second optical system 25 does not pass through the dichroic mirror 241. The light flux of the blue light (corresponding to the light flux Q illustrated in FIG. 1A) emitted from the phosphor unit 26 does not intersect the dichroic mirror 24. On the other hand, as illustrated in FIG. 16B, the fluorescence light path is similar to, even if not the same as, the fluorescence light path of the first embodiment.

In the light-source device 201 according to the second embodiment, the optical path of the blue light emitted from the laser source 21 is different before and after reflection by the phosphor unit 26. Accordingly, similarly to the light-source device 20 according to the first embodiment, the reliability of the light-source device can be enhanced and the size and cost of the light-source device can be reduced.

Particularly, in the light-source device 201, the width of the dichroic mirror 241 can be smaller than the width of the second optical system 25. Accordingly, the size of the light-source device 201 can be reduced. Further, in the light-source device 201, the optical path of the blue light reflected by the phosphor unit 26 does not pass through the dichroic mirror 241. Such a configuration can restrain a decrease in the utilization efficiency of light due to the transparency of the dichroic mirror 241.

Third Embodiment

Figure 18A:
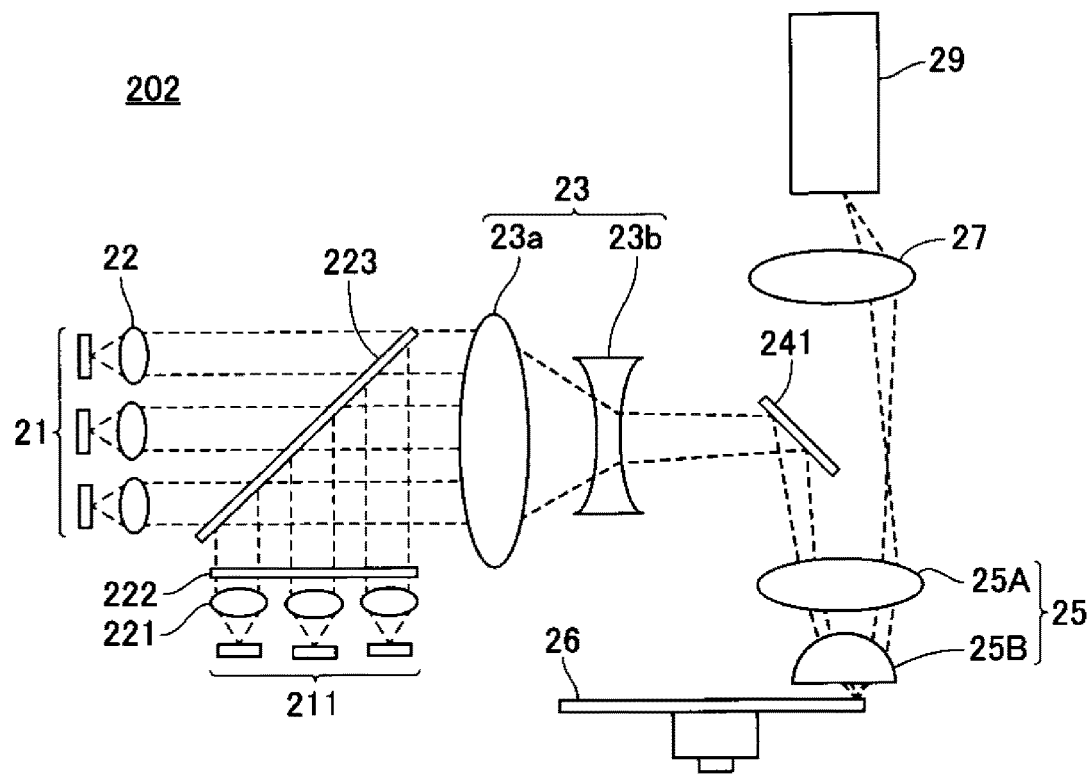
Figure 18B:
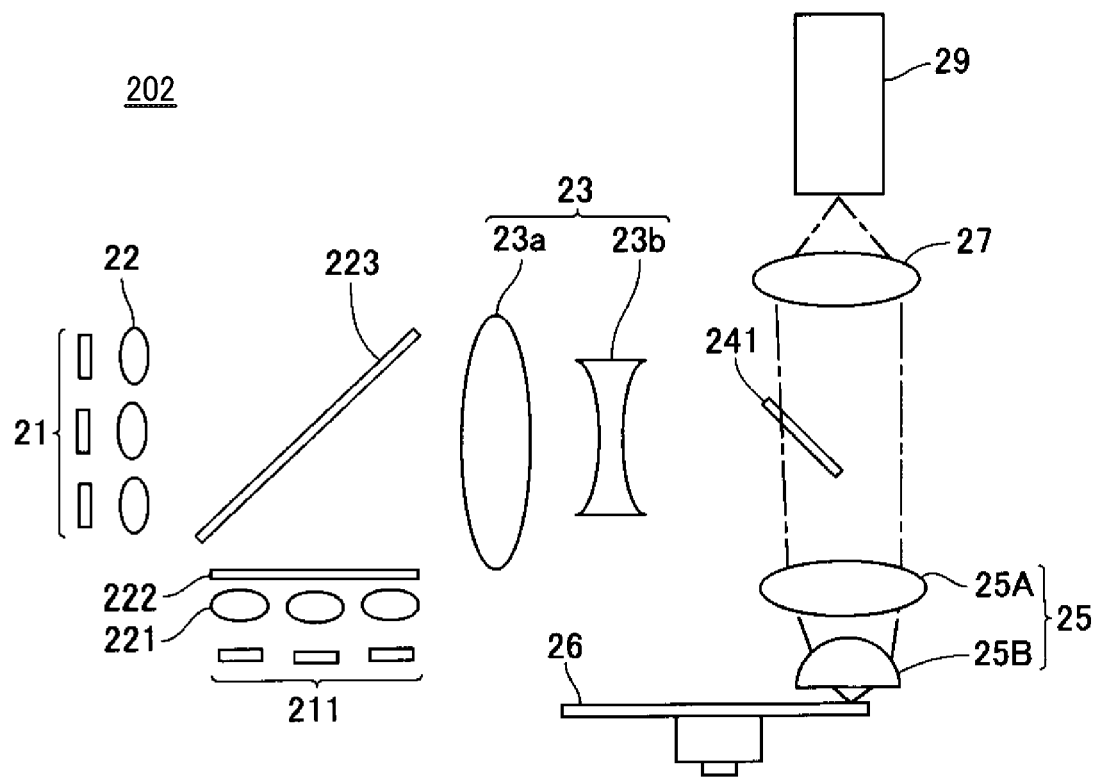

Next, a light-source device 202 according to a third embodiment illustrated in FIGS. 18A and 18B is described.

The light-source device 202 is different from the light-source device 201 according to the second embodiment in that the light-source device 202 includes a first light source unit and a second light source unit and that the light-source device 202 includes a polarization optical component to combine the excitation light from the second light source unit with the excitation light from the first light source unit. The first light source unit includes a laser source 21 and a coupling lens 22. The second light source unit includes a laser source 211 and a coupling lens 221.

FIG. 18A indicates the optical path of the blue laser beam in the light-source device 202 according to the third embodiment. FIG. 18B indicates the optical path of the fluorescence light in the light-source device 202 according to the third embodiment. In FIGS. 18A and 18B, the same reference numerals are given to the same components as the components of the second embodiment, and redundant description thereof is omitted. In FIG. 18B, a part of the optical path of the fluorescence light is omitted for convenience of illustration.

As illustrated FIGS. 18A and 18B, the light-source device 202 includes a laser source 211 and coupling lenses 221, which constitute the second light source unit. The second light source unit is arranged so that the laser beams emitted from the laser source 211 are orthogonal to the laser beams emitted from the laser source 21 of the first light source unit.

The laser source 211 has the same configuration as the laser source 21. In other words, in the laser source 211, laser diodes as light sources that emit a plurality of laser beams are arranged in array. The laser source 211 emits, for example, blue light in a blue band where the center wavelength of emission intensity is 455 nm. In this case, each of the laser sources 21 and 211 is configured to emit P-polarized light. In a similar manner to the coupling lens 22, the coupling lens 221 is a lens that receives blue light emitted from the laser source 211 and converts the blue light into parallel light, in other words, collimated light.

The light-source device 202 includes a half-wave retarder 222 and a polarization splitter 223 that constitute a polarization optical component. The half-wave retarder 222 is arranged to face the plurality of coupling lenses 221. The half-wave retarder 222 converts a P-polarized component of blue light emitted from the laser source 211 into an S-polarized component. The polarization splitter 223 is disposed in the optical path of the blue light emitted from the laser source 21 and the blue light emitted from the laser source 211. The polarization splitter 223 has an optical property that reflects the S-polarized component of the blue light while transmitting the P-polarized component of the blue light.

The P-polarized component of the blue light emitted from the laser source 21 passes through the polarization splitter 223 and is incident on the large-diameter lens 23a of the first optical system 23. After the P-polarized component of the blue light emitted from the laser source 211 is converted into the S-polarized light by the half-wave retarder 222, the S-polarized light is reflected by the polarization splitter 223 and is incident on the large-diameter lens 23a of the first optical system 23. Thus, the excitation light of blue from the second light source unit is combined with the excitation light of blue from the first light source unit.

The blue light optical path and the fluorescence light path of the light-source device 202 having such a configuration are described with reference to FIGS. 18A and 18B. As illustrated in FIGS. 18A and 18B, the blue light path and the fluorescence light path after being combined by the polarization splitter 223 and incident on the large-diameter lens 23a of the first optical system 23 are similar to, even if not the same as, those in the second embodiment.

In the light-source device 202 according to the third embodiment, the optical path of the blue light emitted from the laser source 21 is different before and after reflection by the phosphor unit 26. Accordingly, similarly to the light-source device 201 according to the second embodiment, good reliability can be obtained and size and cost reduction can be achieved. Particularly, in the light-source device 202, since the excitation light from the second light source unit is combined with the excitation light from the first light source unit, the luminance of the excitation light can be increased, and the utilization efficiency of light can be enhanced. Further, since the polarization is controlled by the half-wave retarder 222 and the polarization splitter 223 constituting the polarization optical component, the optical paths can be separated from and combined with each other regardless of the presence or absence of the polarization component of the light emitted from the light source.

Fourth Embodiment

Next, a light-source device 203 according to a fourth embodiment illustrated in FIG. 19 is described. The light-source device 203 is different from the light-source device 201 according to the second embodiment in that the light-source device 203 includes a phosphor unit 261 different from the phosphor unit 26. Hereinafter, the configuration of the light-source device 203 according to the fourth embodiment is described below, focusing on differences from the light-source device 201 according to the second embodiment.

Figure 19B:
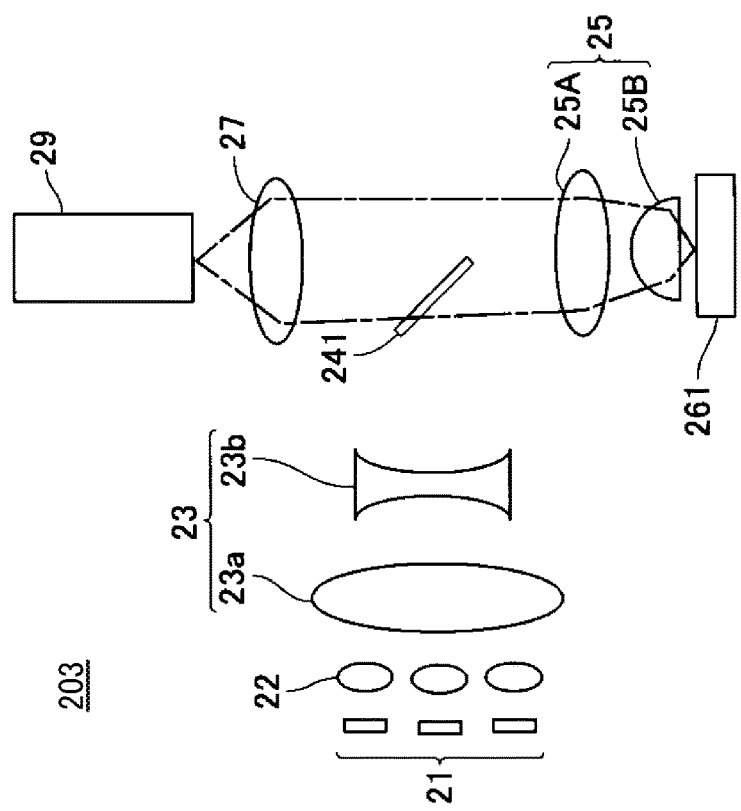
Figure 19A:
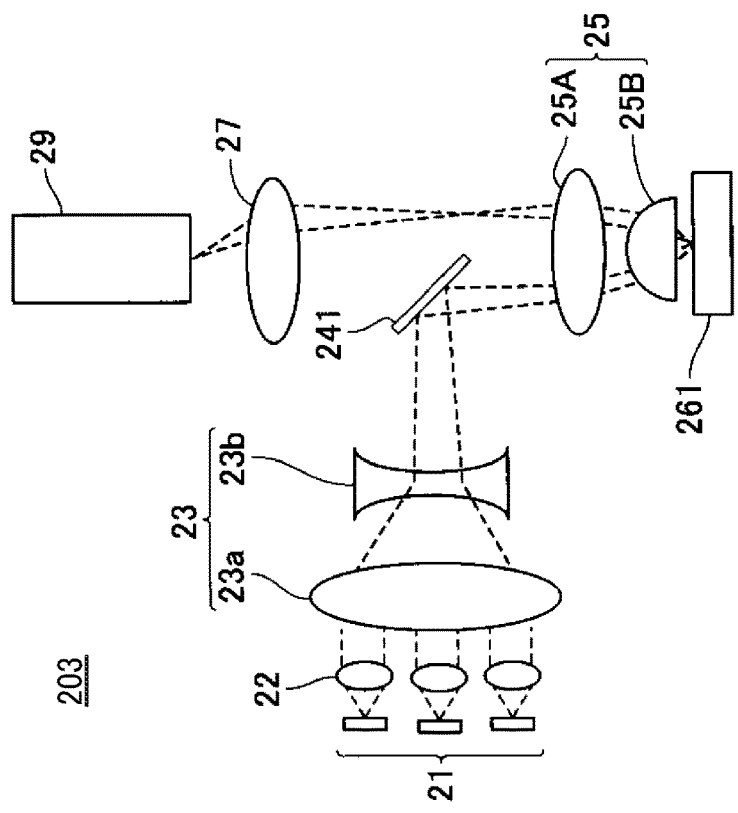

FIG. 19A depicts the optical path of a blue laser beam in the light-source device 203. FIG. 19B depicts the optical path of fluorescence light in the light-source device 203. In FIGS. 19A and 19B, the same reference numerals are given to the same components as the components of the second embodiment, and redundant description thereof is omitted. In FIG. 19B, a part of the optical path of the fluorescence light is omitted for convenience of illustration.

The light-source device 203 according to the fourth embodiment includes a phosphor unit 261 (hereinafter, referred to as a stationary phosphor unit where appropriate) that is not driven to rotate, instead of the phosphor unit 26 that is driven to rotate. The stationary phosphor unit 261 reflects a portion of the blue light (excitation light) emitted from the laser source 21 with a change from the blue light. The stationary phosphor unit 261 converts the other portions of the blue light into fluorescence light and emits the fluorescence light.

Figure 20:
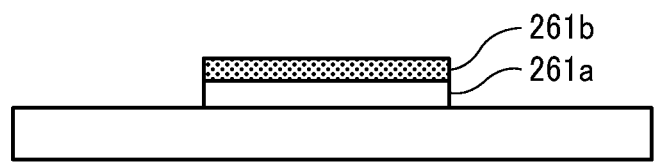
FIG. 20 is a schematic side view of a configuration of a phosphor unit included in the light-source device according to the fourth embodiment.

FIG. 20 depicts a configuration of the stationary phosphor unit 261 in the light-source device 203 according to the fourth embodiment. FIG. 20 depicts the stationary phosphor unit 261 viewed from a direction perpendicular to the incident direction of the blue light. As illustrated in FIG. 20, the stationary phosphor unit 261 is configured by stacking a phosphor 261b as the wavelength conversion member on a reflection member 261a that reflects excitation light. For example, the reflection member 261a and the phosphor 261b have a rectangular shape in plan view. The phosphor 261b is applied on the reflection member 261a.

The phosphor 261b converts, for example, 80% of the incident blue light (excitation light) into fluorescence light. Once the blue light is incident on the stationary phosphor unit 261, 80% of the blue light acts as excitation light for the phosphor 261b, and the wavelength of the blue light is converted with the phosphor 261b. As a result, the fluorescence light including, for example, a yellow wavelength band where the center wavelength of emission intensity is 550 nm is generated, and the fluorescence light is Lambertian-reflected by the phosphor 261b and the reflection member 261a.

For example, 20% of the blue light (excitation light) incident on the stationary phosphor unit 261 does not act as excitation light and is reflected by the reflection member 261a. As a result, once the blue light is incident on the stationary phosphor unit 261, the blue light and the fluorescence light are emitted from the stationary phosphor unit 261 simultaneously.

The blue light optical path and the fluorescence light path in the light-source device 203 having the above-described configuration are described with reference to FIGS. 19A and 19B. As illustrated in FIGS. 19A and 19B, the blue light path and the fluorescence light path in the light-source device 203 are the same as those in the second embodiment except for the wavelength conversion and reflection in the stationary phosphor unit 261.

In the light-source device 203 according to the fourth embodiment, the optical path of the blue light emitted from the laser source 21 is different before and after reflection by the stationary phosphor unit 261. Accordingly, similarly to the light-source device 201 according to the second embodiment, good reliability can be obtained and size and cost reduction can be achieved. Particularly, in the light-source device 203, since the blue light and the fluorescence light are emitted simultaneously by the stationary phosphor unit 261, there is no need to drive the phosphor unit to rotate, and the manufacturing cost of the device can be reduced. Since the motor for rotational driving is not used, noise can be reduced a decrease in reliability due to the life of the motor is prevented.

Fifth Embodiment

Figure 21A:
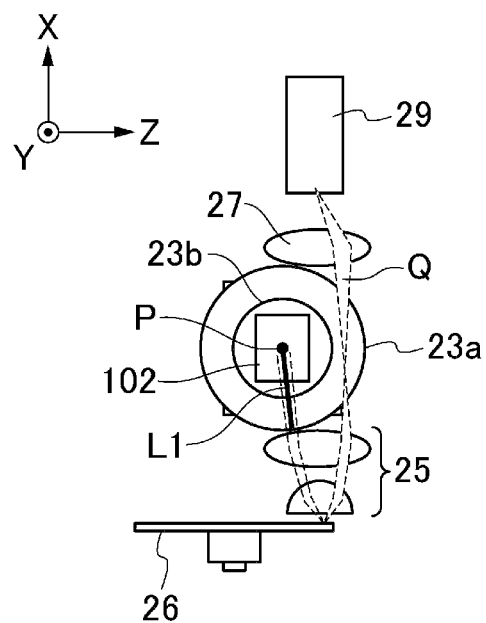
Figure 21B:
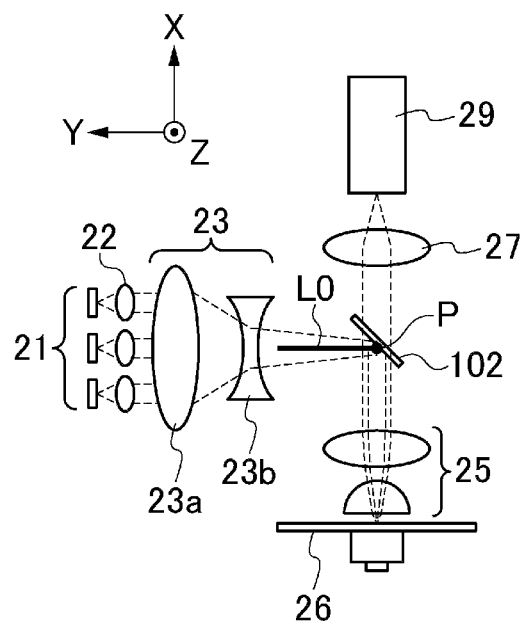

Next, a fifth embodiment illustrated in FIG. 21 is described. Since the basic configuration is the same as the configuration of the second embodiment, characteristic components are described. FIGS. 21A and 21B both depict the configuration of the present embodiment. In FIGS. 21A and 21B, the vertical direction is defined as an X direction, an emission direction of a light ray from a light source unit orthogonal to the X direction is defined as a Y direction, and a direction orthogonal to both the X direction and the Y direction is defined as a Z direction. FIG. 21B depicts the structure of FIG. 21A as viewed from a direction rotated by 90° about the X-axis.

In FIGS. 21A and 21B, when a straight line connecting the substantial center of a light ray flux emitted from the light source unit and the point P is defined as a straight line L0, the straight line L0 perpendicularly intersects a plane including a straight line L1 and a light ray flux Q. Such a configuration can reduce the size in the Z-axis direction in FIG. 21A. Further, conditions 1 and 2 of the polarization direction, which are described later, can be achieved at the same time, and the light use efficiency can be enhanced.

Figure 22A:
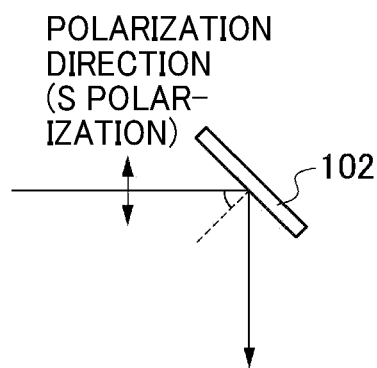
Figure 22B:
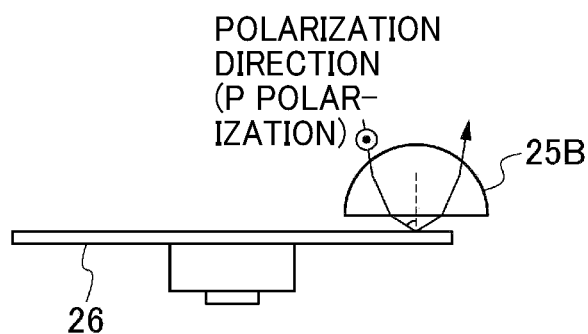

FIG. 22A depicts a state in which blue light is incident on the dichroic mirror 102 in the present embodiment. FIG. 22B depicts a state in which blue light is incident on the phosphor unit 26. As illustrated in FIG. 22A, the blue light is preferably incident on the dichroic mirror 102 as S-polarized light. This is referred to as "polarization condition 1". As illustrated in FIG. 22B, the blue light is preferably incident on the phosphor unit 26 as P-polarized light. This is referred to as "polarization condition 2". This is because S-polarized light generally has a higher reflectance when light is incident on a surface at an angle. Thus, the dichroic mirror 102 reflects S-polarized light so as to further increase the reflectance, and P-polarized light is incident on the phosphor region to reduce the surface reflection so that more blue light is incident on the phosphor.

In the configuration of the present embodiment, since the polarization direction is rotated by 90° by the dichroic mirror 102 and the phosphor unit 26, both the polarization condition 1 and the polarization condition 2 are satisfied, thus enhancing the light use efficiency.

Sixth Embodiment

Figure 23A:
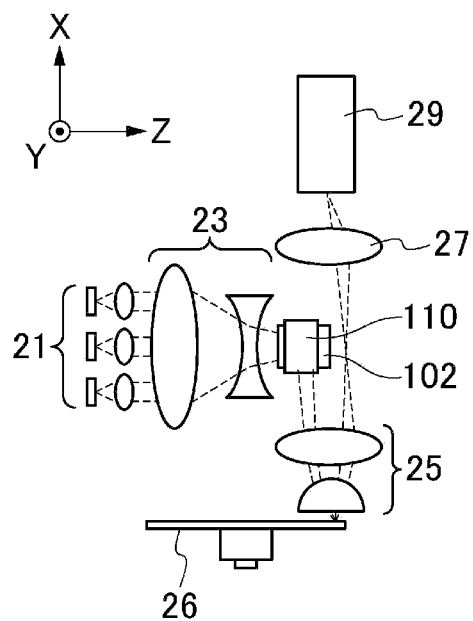
Figure 23B:
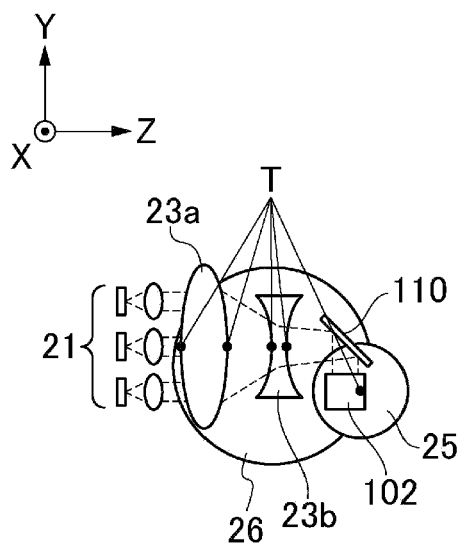
Figure 24A:
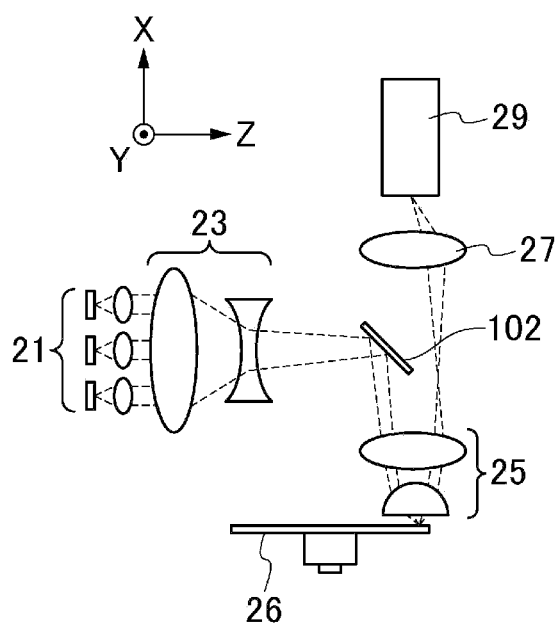
Figure 24B:
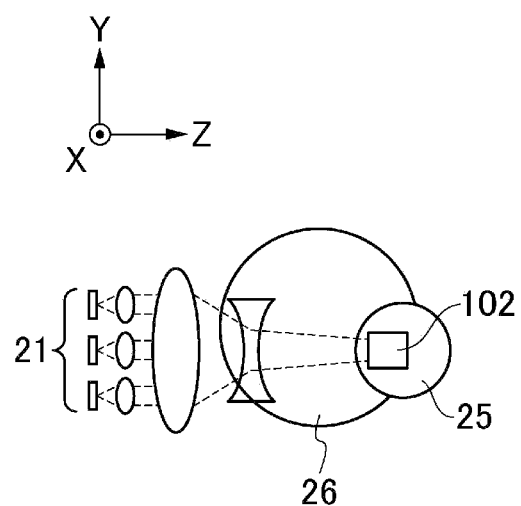

FIG. 23 illustrates a light-source device according to a sixth embodiment of the present disclosure. FIG. 23A is a side view of the light-source device according to the present embodiment. FIG. 23B is a top view of the light-source device of FIG. 23A rotated by 90° about the Z-axis. FIGS. 24A and 24B depict the second embodiment for comparison with the sixth embodiment. FIG. 24A is a side view of the light-source device according to the second embodiment. FIG. 24B is a top view of the light-source device of FIG. 24A rotated by 90° about the Z-axis.

In the present embodiment, as illustrated in FIGS. 23A and 23B, a mirror 110 is placed in front of the dichroic mirror 102 to bend the optical path of illumination light from a light source. Thus, the dimension in the Z-axis direction can be reduced. The size in the Y-axis direction is almost the same as that in the second embodiment illustrated in FIG. 24B.

In the present embodiment, since the diameter $\varphi$ of the rotary phosphor unit 26 is from 50 to 60 mm and the phosphor unit 26 is a relatively large component in the small light-source device, the size of the phosphor unit 26 is dominant in the size in each of the Y-axis direction and the Z-axis direction. Therefore, by utilizing a projection space in the plane direction of the phosphor unit 26 generated by folding the optical path by the mirror 110, the components can be arranged in the projection space, thus allowing the light-source device to be greatly downsized.

FIG. 23B depicts such a configuration. As illustrated in FIG. 23B, when all the lenses are arranged so that the surface apexes T of all the lenses fall within the projection plane of the disc-shaped phosphor unit 26 when viewed from the X-axis direction, the entire light-source device is close to a cube and is compact.

Further, the mirror 110 may have a function of adjusting the degree of condensation of blue light on the surface of the phosphor unit 26. For example, when the mirror 110 is a diffuse reflecting surface, the mirror 110 can diffuse the blue light with which the phosphor unit 26 is irradiated, to make the degree of condensation of the blue light on the phosphor unit 26 uniform, and to increase the conversion efficiency of the phosphor unit 26.

Seventh Embodiment

Figure 26:
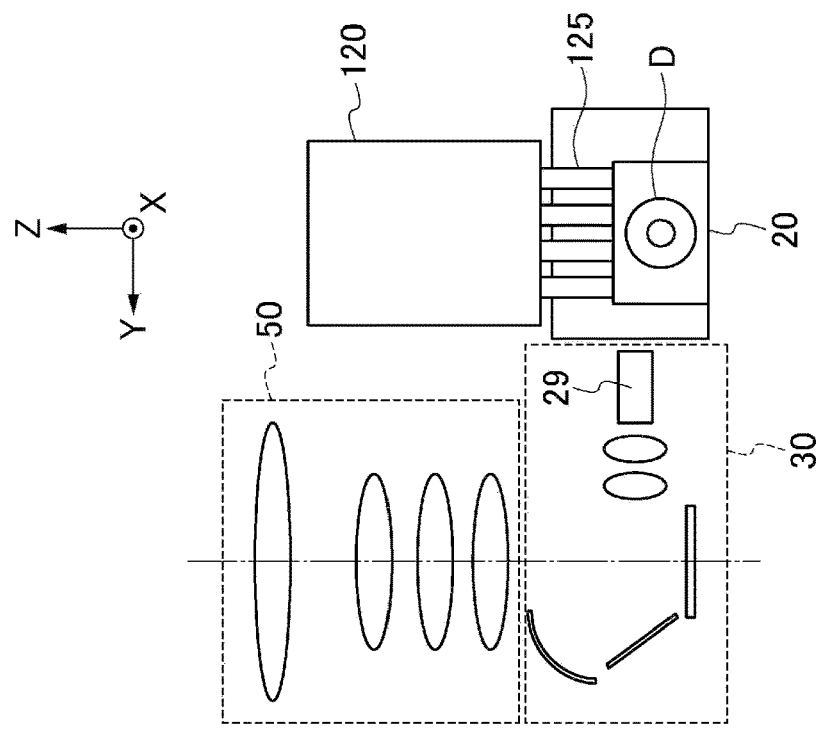
FIG. 26 is a front view of a light-source device according to a comparative example of the seventh embodiment.
Figure 25:
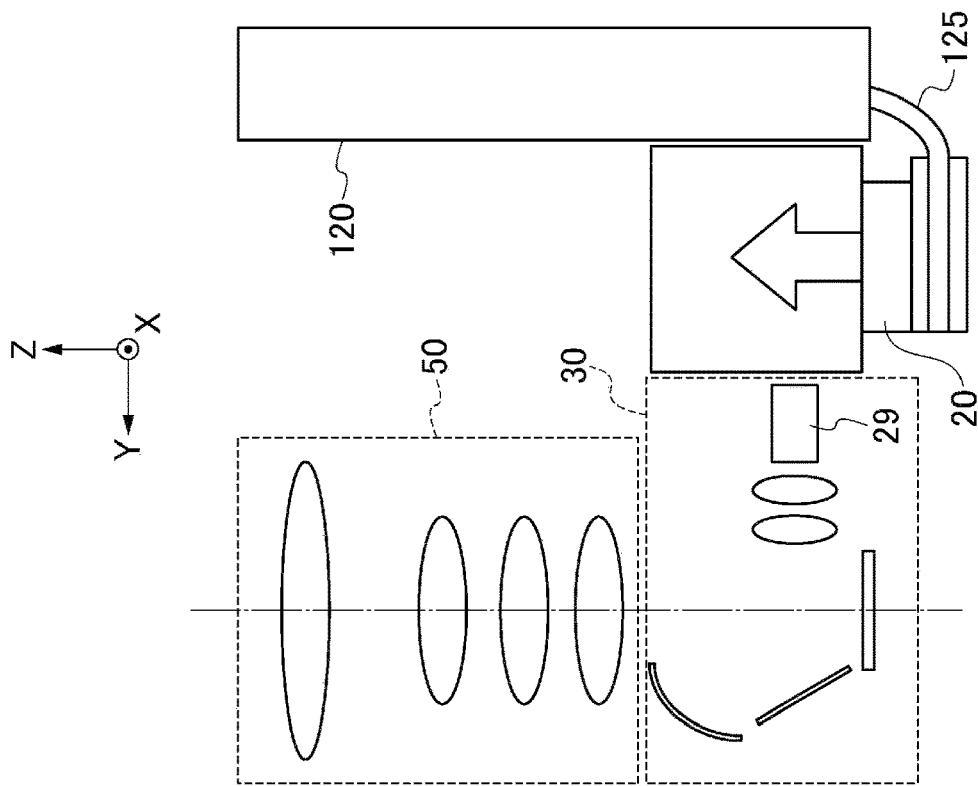
FIG. 25 is a front view of a light-source device according to a seventh embodiment of the present disclosure.

FIG. 25 depicts a light-source device according to a seventh embodiment of the present disclosure. FIG. 26 depicts a comparative example of the seventh embodiment. A light-source device 20 according to the seventh embodiment is connected to and cooled by a radiator 120 via a heat pipe 125. In the present embodiment, the optical axis of a projection optical system 50 and the emission direction of excitation light emitted from the light-source device 20 are perpendicular to each other.

In the comparative example illustrated in FIG. 26, when a space in which the light-source device 20 and the radiator 120 can be disposed is connected via the heat pipe 125, the heat pipe 125 is bent, thus causing a decrease in cooling efficiency. Accordingly, in order to obtain a predetermined amount of heat, the radiator 120 becomes large.

On the other hand, according to the present embodiment, since the heat pipe 125 can be coupled to the radiator 120 without being greatly bent, the cooling efficiency is not so reduced, thus allowing the light-source device 20 to be efficiently cooled.

As illustrated in FIG. 25, since the radiator 120 can be disposed in a space adjacent to the projection optical system 50, the space can be effectively used, thus allowing the entire projector to be further downsized. In the present embodiment, a heat pipe is used as an example of the cooling means. However, for example, a loop heat pipe may also be used, or a heat radiation member such as a heat sink may be directly provided for the light source.

In a light-source device according to an embodiment of the present disclosure, since the excitation light is obliquely incident on the light mixing element, luminance unevenness may occur at the exit of the light tunnel depending on the size of the light mixing element. Since the luminance unevenness directly becomes luminance unevenness on the screen, it is preferable to generate the luminance unevenness so that the image on the screen can be easily viewed. For example, in general, luminance unevenness occurring in a projection image is more preferable in the vertical direction than in the horizontal direction, and it is easier to see the projection image when the lower side close to the line of sight of a person is bright. Therefore, as illustrated in FIG. 27, it is preferable to make the excitation light incident on the light mixing element so that the lower part of the screen becomes brighter.

Eighth Embodiment

An eighth embodiment is described with reference to FIGS. 28A, 28B, 28C, and 28D. Since a basic configuration of the eighth embodiment is the same as that of the first embodiment, characteristic portions are described. The eighth embodiment can use the light-source device according to any suitable one of the above-described embodiments. A light-source device according to an embodiment of the present disclosure may be arranged such that excitation light incident on a rod integrator is incident on the inner side corresponding to the long side of the rod integrator. Such a configuration can reduce luminance unevenness at the exit of the rod integrator that may cause luminance unevenness on the screen. Reducing the luminance unevenness allows an "image with uniform brightness" to be viewed. As described above, it is generally preferable to "reduce luminance unevenness on the screen".

However, in some cases, an image projected on the screen can be easily viewed by "utilizing the luminance unevenness". For example, when an image is projected on a screen located above the height of human eyes, in other words, when a viewer looks up an image on the screen, the image is more easily viewed when the "lower side of the screen" close to the height of human eyes is brighter. Therefore, in such a case, the excitation light is preferably incident on the rod integrator so that the lower side of the screen becomes bright.

Figure 28A:
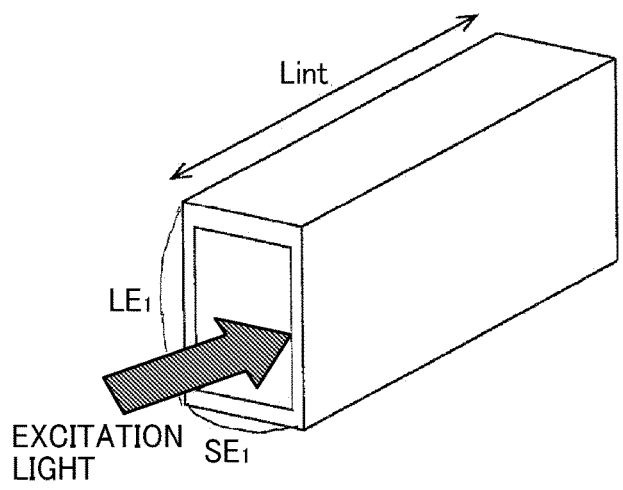
FIGS. 28A and 28B are perspective views of a rod integrator in a light-source device according to an eighth embodiment of the present disclosure and FIGS. 28C and 28D are illustrations of examples of appearance of luminance unevenness with the rod integrator.
Figure 28B:
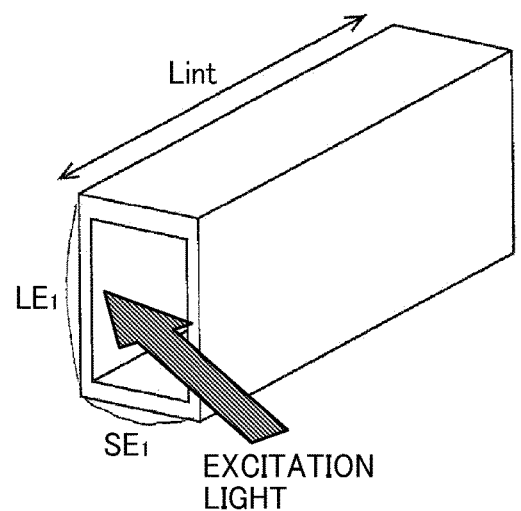
Figure 28C:
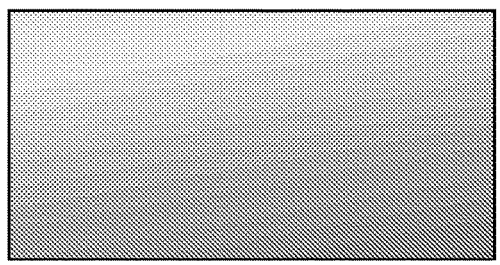
Figure 28D:
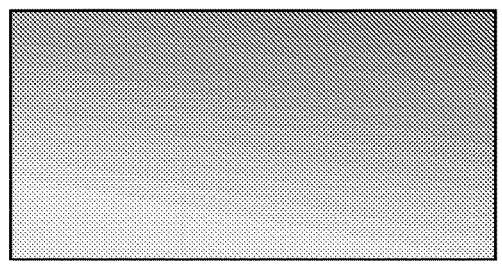

As illustrated in FIGS. 28A to 28D, when the excitation light is incident on "a surface having a long side of a length $LE_1$", luminance unevenness occurs in the vertical direction of the screen. When the excitation light is incident on the rod integrator from the left side in FIG. 28A, the upper side of the screen becomes brighter as illustrated in FIG. 28C. When the excitation light is incident on the rod integrator from the right side in FIG. 28B, the lower side of the screen becomes brighter as illustrated in FIG. 28D. Which of the upper side and the lower side becomes brighter varies depending on the length Lint of the rod integrator, the configuration of the illumination optical system, and the "configuration of the projection optical system that projects the light flux emitted from the rod integrator". Therefore, the illumination optical system can be designed according to which of the upper side and the lower side of the screen is brighter, although need be appropriately designed.

Below, further four embodiments of the present disclosure are described as a ninth embodiment to a twelfth embodiment. In the ninth to twelfth embodiments, the optical paths of the excitation light and the fluorescence light in the above-described embodiments are three-dimensionally configured. As described above, in FIG. 5A, it is described to be preferable that a plane including the straight line L1 and the straight line L2, in other words, a plane including the surface of the drawing sheet in which FIG. 5A is drawn is substantially parallel to the shorter side $SE_1$ of the incident aperture 104a of the rod integrator 104. However, in some embodiments, the plane including the straight line L1 and the straight line L2 may not necessarily be parallel to the shorter side $SE_1$ of the incident aperture 104a of the rod integrator 104. In other words, the rod integrator 104 may be slightly rotated about the straight line L2.

Ninth Embodiment

Figure 29A:
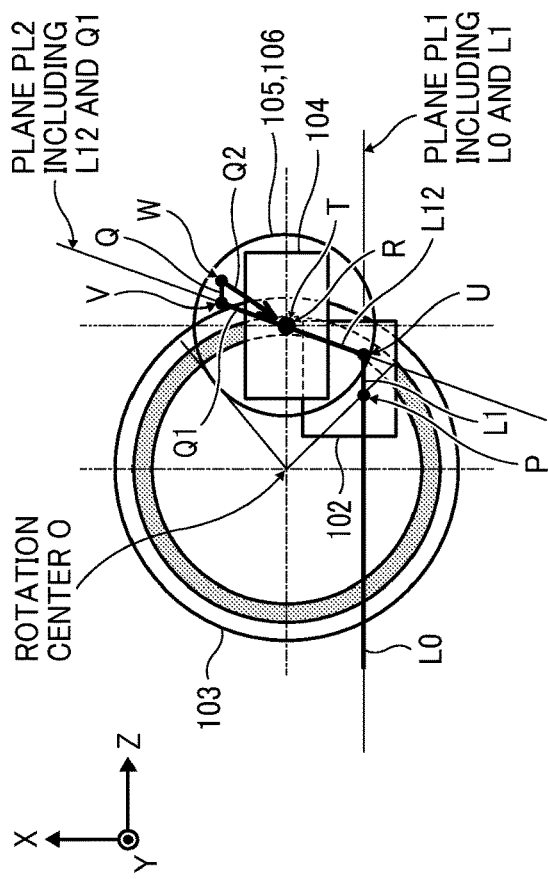
FIGS. 29A and 29B are illustrations of a light-source device according to a ninth embodiment of the present disclosure.
Figure 29B:
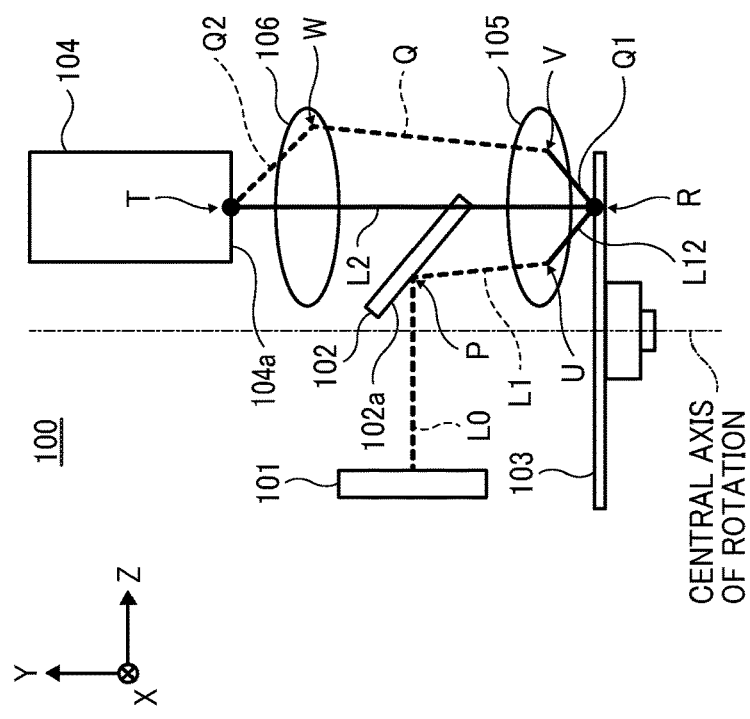

In a light-source device according to the ninth embodiment illustrated in FIGS. 29A and 29B, the long side of the incident aperture of the rod integrator 104 is parallel to the plane including the straight line L1 and the straight line L2. A feature of the present embodiment is that a plane including the optical path of excitation light incident on an optical member and the optical path of excitation light reflected by the optical member toward a light condensing element (the optical path before and after the optical member) is not parallel to a plane including the optical path of excitation light between the light condensing element and a wavelength conversion unit (the optical path before and after the wavelength conversion unit).

The configuration illustrated in FIG. 29A is similar to, even if not the same as, the configuration illustrated in FIG. 5A. In FIG. 5A, the plane including the straight line L1 and the straight line L2 is in the plane including the surface of the drawing sheet in which FIG. 5A is drawn. In other words, in FIG. 5A, the straight line L2 intersects with the extension of the straight line L1. However, in the ninth embodiment described here, the extension of the straight line L1 does not intersect with the straight line L2.

Reference numerals in FIG. 29A is described. L0 denotes an optical path (straight line) from a substantially central portion of a light ray flux emitted from a light source 101 to a point P. L1 denotes an optical path (straight line) connecting the center of a projection image on an incident surface 105a of a condenser lens 105, onto which excitation light incident on the condenser lens 105 is projected, and the point P on a reflecting surface 102a. L12 denotes an optical path (straight line) along which a light ray passing through a substantially central point of a light ray flux forming a projection image on the incident surface 105a exits from an exit surface 105b of the condenser lens 105 and travels toward a reflection point R. Q denotes a light flux of excitation light emitted from the phosphor unit 103. Q1 denotes an optical path that is reflected at the reflection point R and travels toward the condenser lens 105. Q2 denotes an optical path that is refracted by the refractive lens 106 and travels toward a point T at which light is incident on the rod integrator 104. The optical paths Q1 and Q2 are optical paths representing a central light ray of the light flux and are also referred to as light rays Q1 and Q2. The central light ray of the light flux Q may also be referred to as a light ray Q, assuming that the central light ray is a representative light lay of the light flux Q. In addition, Q, Q1, and Q2 may also be referred to as a light flux Q, a light flux Q1, and a light flux Q2 by being regarded as light fluxes including the light rays Q, Q1, and Q2. U denotes an imaginary intersection of the light ray L1 and the light ray L2. V denotes an imaginary intersection of the light ray Q1 and the light ray Q. W denotes an imaginary intersection of the light ray Q and the light ray Q2.

In order to clarify the three-dimensional positional relationship, the direction in which light is incident on the reflecting surface 102a is defined as the Z-axis, and the X, Y and Z coordinate axes of the right-handed system are defined as illustrated in the FIGS. 29A and 29B. FIG. 29A is a view of the YZ plane viewed from the minus side of the X-axis. FIG. 29B is a view of the state of FIG. 29A viewed from the side of the rod integrator 104, in other words, a view of the ZX plane viewed from the plus side of the Y-axis.

As illustrated in FIGS. 29A and 29B, the light ray emitted from the light source 101 is directed to a dichroic mirror 102 directly or after being folded (directly in FIG. 29A), and the light ray incident on the dichroic mirror 102 travels along a straight line L0. The straight line L0 itself may be regarded as a light ray. It is assumed that the light emitted from the light source 101 is treated as a "flux of light rays traveling with a constant width or discretely", and the "optical path substantially at the center of the flux of light rays" is defined as the straight line L0. The light source includes a single light emitting portion or a plurality of light emitting portions arranged in array on a certain surface, and the optical path of the center is the straight line L0 as the center of the single light emitting portion or a substantially center of the plurality of light emitting portions arranged in array. The straight line L0 is not limited to the center of the light-emitting portion or the light-emitting portion group, and is assumed to be the optical path of the substantially center of the flux of light rays. The light ray traveling along the straight line L0 is reflected at the point P, is incident on the condenser lens 105, and travels to the point R by the refraction action of the condenser lens 105. At this time, the point R on the phosphor unit 103 is a reflection region, and the light ray Q1 is regularly reflected at the point R and travels toward the condenser lens 105 again. The light flux Q1 is refracted by the refraction action of the condenser lens 105 to become the light flux Q. The light flux Q is refracted by the condensing action of the refractive lens 106 to become the light flux Q2, which travels toward the point T.

Originally, the light ray passing through the condenser lens 105 is refracted at the boundary of the lens and travels toward the point R (in this example, condensing point). However, in FIG. 29A, the light ray is illustrated as being refracted at a point U inside the condenser lens 105. This is for the purpose of simplifying the explanation in order to correctly convey the features of the present embodiment, and actually, the light is refracted when passing through the lens interfaces (for example, 105a or 105b in FIG. 3). The same applies to the bending point V at which the light ray Q1 reflected at the point R is refracted to become the light ray Q, and the same applies to the bending point W at which the light ray Q is refracted by the refractive action of the refractive lens 106 to become the light ray Q2.

In the light-source device 100 of the present embodiment, as illustrated in FIG. 29B, a plane PL1 including the straight line L0 and the straight line L1 and a plane PL2 including the straight line L12 and the light flux (light ray) Q1 are "not in a parallel relationship (are not parallel to each other)". Further, a straight line (an extension of the straight line L1) including a light ray traveling straight along the straight line L1 does not intersect the straight line L2 (perpendicular to the point R) due to the refractive power of the condenser lens 105. In the light-source device 100 of the ninth embodiment, the long side of the incident aperture of the rod integrator 104 is parallel to the plane PL1.

Tenth Embodiment

Figure 30:
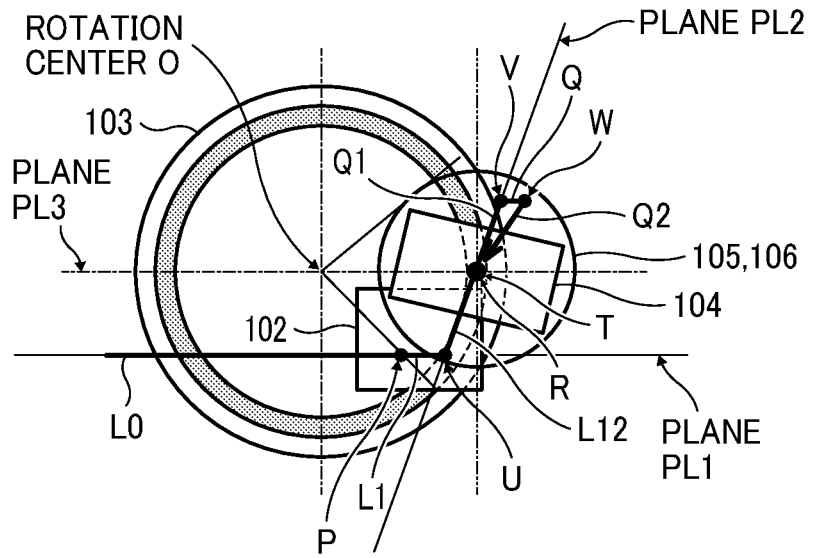
FIG. 30 is an illustration of a light-source device according to a tenth embodiment of the present disclosure.

A light-source device of the tenth embodiment illustrated in FIG. 30 is a modification of the ninth embodiment described above, is different from the ninth embodiment in that the long side of an incident aperture of a rod integrator 104 is slightly rotated clockwise with respect to a plane PL1, and is the same as the ninth embodiment in other respects.

Eleventh Embodiment

Figure 31:
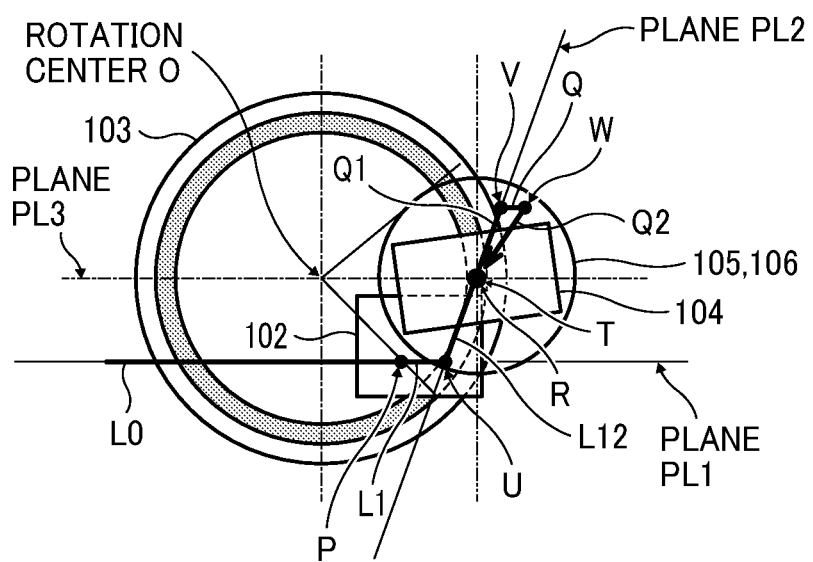
FIG. 31 is an illustration of a light-source device according to an eleventh embodiment of the present disclosure.

A light-source device of the eleventh embodiment illustrated in FIG. 31 is also a modification of the ninth embodiment described above, is different from the ninth embodiment in that the long side of an incident aperture of a rod integrator 104 is slightly rotated counterclockwise with respect to a plane PL1, and is the same as the ninth embodiment in other respects.

In both the tenth and eleventh embodiments, as is clear from FIGS. 30 and 31, the long side of the incident aperture of the rod integrator 104 is "nearly parallel" to the plane PL1, so that most of the light incident on the rod integrator 104 is incident on the long side of the rod integrator 104. The light-source devices according to the ninth to eleventh embodiments are also characterized in that the light source unit and the phosphor unit 103 are arranged so that the central axis of rotation of the phosphor unit 103 does not intersect the light ray L0. Here, the light emitted from the light source 101 is regarded as a flux of light rays traveling with a constant width or discretely. However, the optical path at the substantial center of the flux of light rays is defined as the straight line L0. Since the flux of light rays has a constant width (thickness), an off-center end may intersect the central axis of rotation. In the present disclosure, regarding the light emitted from the light source 101, an optical path (straight line) along a light ray (optical path) substantially at the center of a flux of light rays that travels with a constant width or discretely is referred to as L0 or L1.

In FIGS. 29B, 30, and 31, the state in which the central axis of rotation and the light ray L0 do not intersect is exaggerated. With such a configuration, since the excitation light or the like can be incident so as to strike the inner side surface corresponding to the long side of the incident aperture 104a of the rod integrator 104, the excitation light or the like can be made uniform as the number of reflections of the excitation light or the like inside the rod integrator 104 increases, and the occurrence of color unevenness in the excitation light or the like can be restrained. In addition, in the tenth embodiment and the eleventh embodiment, when a straight line connecting the point R and the center of the projection image on the incident aperture of the rod integrator onto which the first color light is projected is defined as the straight line L2, a plane including the straight line L1 and the straight line L2 is not parallel to the short side direction of the incident aperture of the rod integrator. In other words, the rod integrator 104 is rotated about the straight line L2. Such a configuration can further increase the number of times of reflection on the internal reflecting surfaces, and thus a great effect can be obtained in uniformization.

In particular, in the embodiment illustrated in FIG. 30, a large number of rays of the excitation light reaching the rod integrator 104 easily hit the internal reflection region located on the long side of the rod integrator 104. In other words, it can also be seen that when the width of the flux of light rays of the excitation light increases, the tenth embodiment of FIG. 30 has a wider internal reflection region located on the long side than the eleventh embodiment of FIG. 31. Therefore, the tenth embodiment of FIG. 30 is more preferable. On the other hand, if the layout is adopted such that the plane PL1 and the plane PL2 are parallel to each other, the light is incident from the short side of the rod integrator, which makes it difficult to achieve uniformity. Therefore, the plane PL1 and the plane PL2 are not parallel to each other and preferably have a positional relationship of more than 45 degrees and less than 135 degrees, i.e., approximately 90 degrees. Accordingly, for example, when the plane PL1 and the long-side direction of the rod integrator 104 are aligned, the incident direction of the excitation light can be deflected by substantially 90 degrees without changing the arrangement of the rod integrator 104. Thus, many light rays can be guided to the internal reflection region located on the long side of the rod integrator 104. Accordingly, it is effective in uniformization. Even if the angle formed by the plane PL1 and the plane PL2 is small, the small angle, in other word, the plane PL1 and the plane PL2 not being parallel with each other allows the optical path to be bent in the angled direction, thus causing an effect in downsizing the device. Further, in order to further reduce the volume of the device, a larger effect can be obtained by appropriately setting the angle formed by the plane PL1 and the plane PL2. As described above, the angle formed by the plane PL1 and the plane PL2 is set to about 90 degrees (at least a range of more than 45 degrees and less than 135 degrees), the optical path can be bent more cubically, thus allowing the optical system to be compact.

Figure 32:
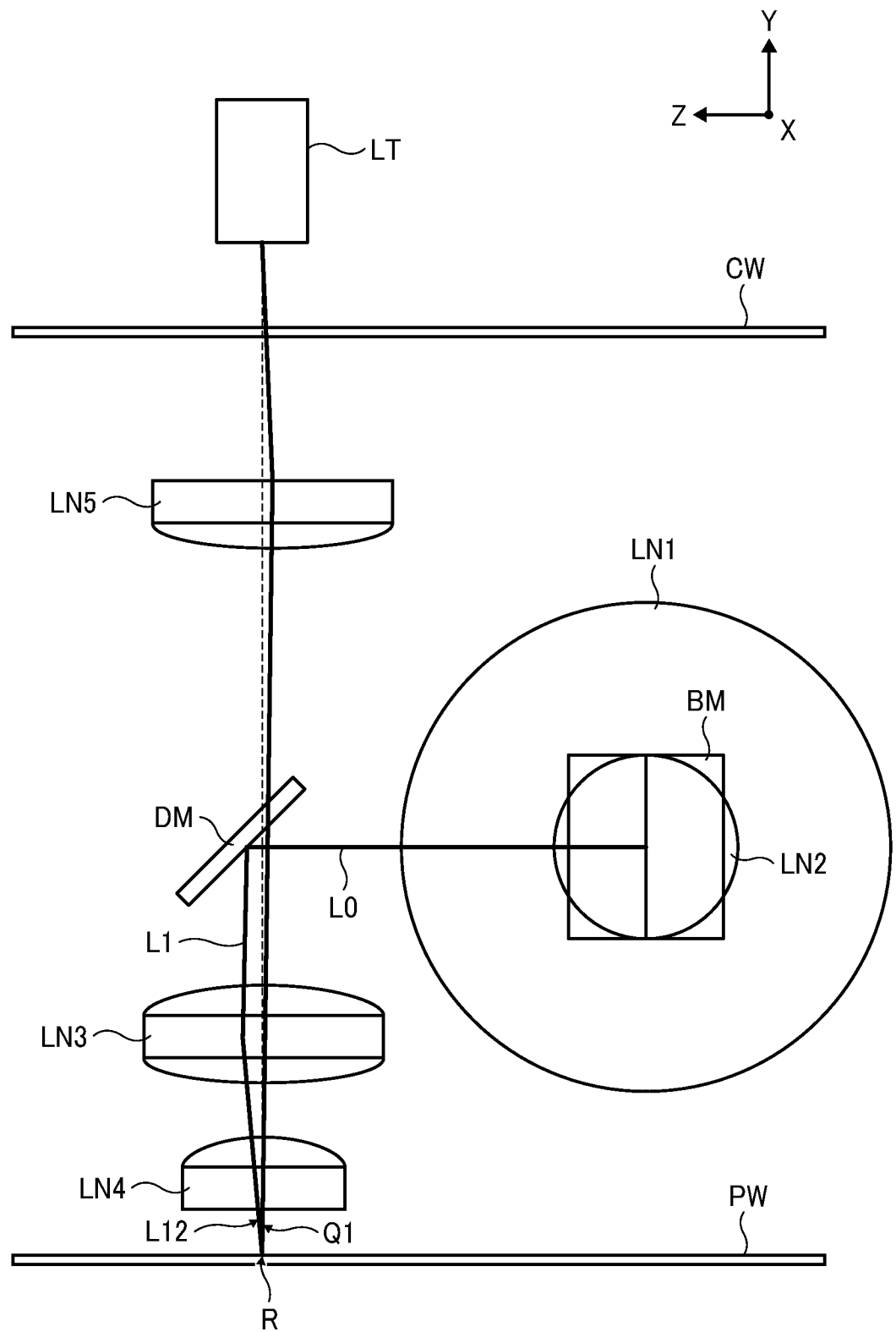
FIG. 32 is an illustration of a light-source device according to a twelfth embodiment of the present disclosure.
Figure 33:
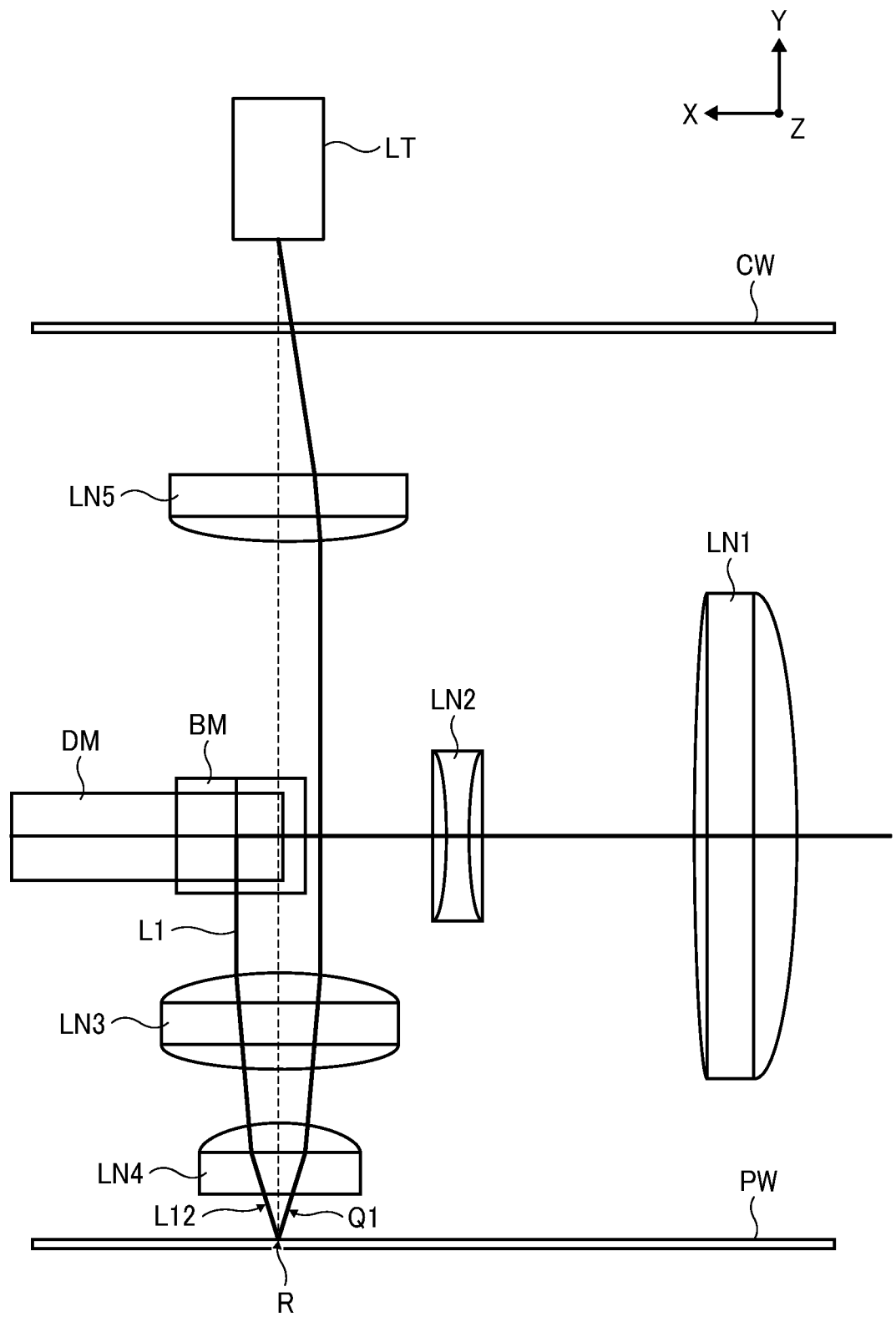
FIG. 33 is an illustration of the light-source device according to the twelfth embodiment of the present disclosure.
Figure 34:
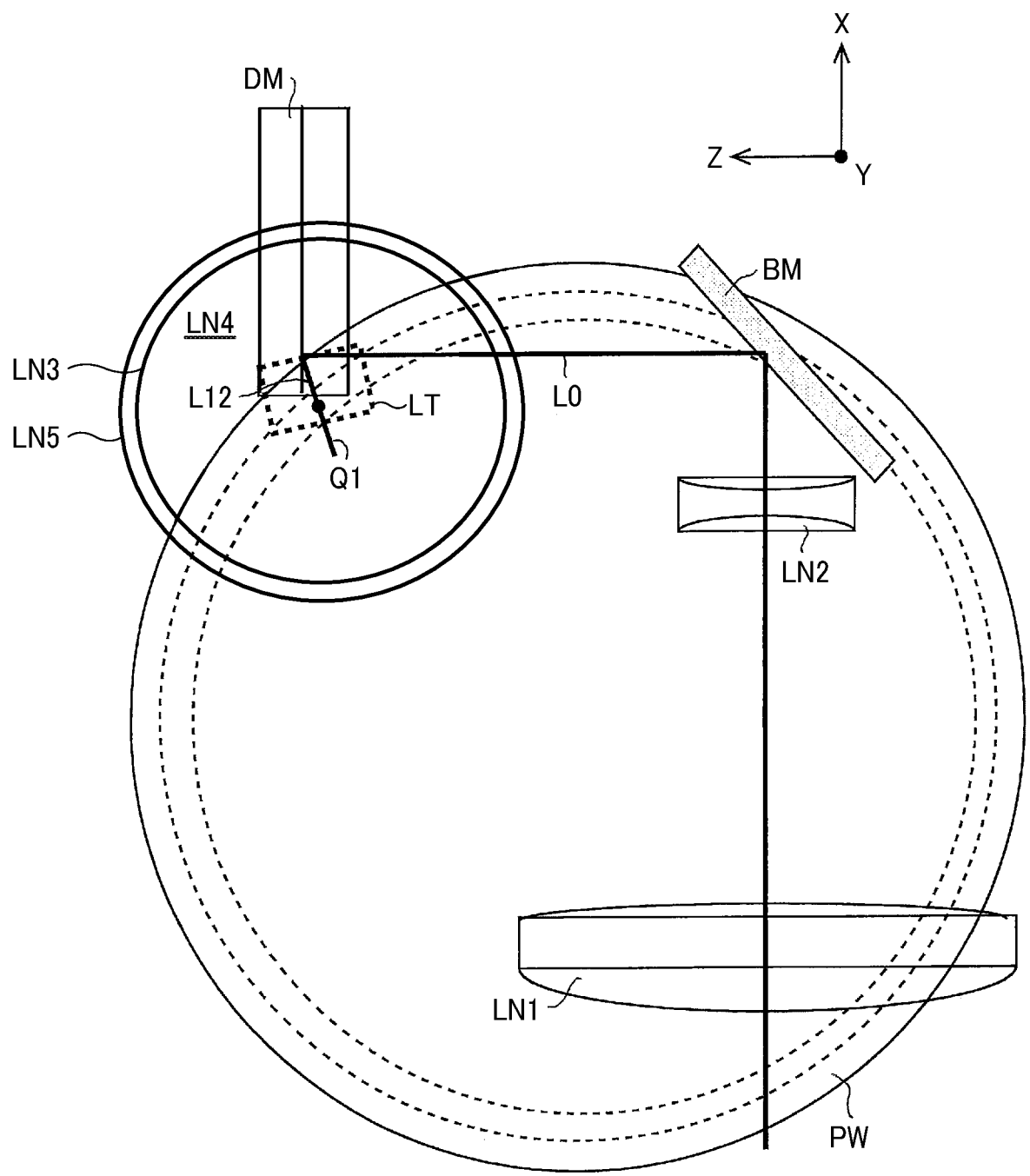
FIG. 34 is an illustration of the light-source device according to the twelfth embodiment of the present disclosure.

Still another embodiment is described as a twelfth embodiment. FIGS. 32, 33, and 34 are illustrations of the twelfth embodiment. FIG. 32 is a view from the same direction as FIG. 29A of the ninth embodiment described above. In FIG. 32, a light ray emitted from a light source LT, which is the same as the light source 101 in FIG. 29A, travels in the plus direction of the X-axis, which is the depth direction of the surface of the drawing sheet in which FIG. 32 is drawn, passes through lenses LN1 and LN2, is folded in the Z direction by a folding mirror BM, and travels toward a reflecting surface 102a (see FIG. 1A) of a mirror DM. The light ray having being folded by the folding mirror BM corresponds to the optical path L0 illustrated in FIGS. 29A, 29B, 30, and 31, and the function thereof is substantially the same. In other words, the dichroic mirror (reflection mirror) 102 in FIGS. 29A to 31 corresponds to the mirror DM in FIGS. 32, 33, and 34.

The light ray reflected by the mirror BM becomes a light ray L1 traveling in the Z direction, in other words, from the right to the left in FIG. 32, which is a direction opposite the direction from the left to the right in FIG. 29B. Then, the light is reflected by the mirror DM in a downward direction in the surface of the drawing sheet in which FIG. 32 is drawn, travels along the optical path L1, is condensed by condenser lenses LN3 and LN4, passes through an optical path L12, and is condensed at a point R on a phosphor unit PW. In the reflection region on the phosphor unit PW, the condensed light-source light is reflected to become high speed Q, condensed again by the lens LN4 and the lens LN3, passes through the vicinity of the mirror DM without interfering with the mirror DM (since the light passes through the front side in the surface of the drawing sheet in which FIG. 32 is drawn and the position in the depth direction of the surface of the drawing sheet is different), and travels toward a lens LN5. Then, the light-source light (excitation light) condensed by the lens LN5 reaches the rod integrator LT. Here, the rod integrator LT is disposed such that the direction parallel to the YZ plane (the surface of the drawing sheet in which FIG. 32 is drawn) is along the long side of the incident surface. In fact, since the point R may be slightly rotated about the line perpendicular to the point R, the direction parallel to the YZ plane is described as being along the long side of the incident surface. The direction parallel to the YZ plane is also along the direction perpendicular to the surface of the drawing sheet in which FIG. 32 is drawn. The light ray (excitation light) incident on the rod integrator LT is a light ray incident on the rod integrator LT from the depth direction with respect to the surface of the drawing sheet in which FIG. 32 is drawn. In other words, many light rays are incident on the long side of the rod integrator LT.

FIG. 33 is a view obtained by rotating FIG. 32 by 90 degrees around the Y-axis. Light rays that are turned back by the mirror DM and travel downward are reflected by the reflecting surface of the phosphor unit PW and travel upward. The respective light rays travel without interfering with each other as illustrated in FIG. 33, are condensed by the lens LN5, and travel toward the rod integrator LT via a color wheel CW. Here, the rod integrator LT is disposed such that the direction parallel to the XY plane (the surface of the drawing sheet in which FIG. 33 is drawn) is along the short side. The light ray (excitation light) incident on the rod integrator LT is a light ray incident on the rod integrator LT from the direction parallel to the surface of the drawing sheet in which FIG. 33 is drawn. In other words, many light rays are incident on the long side of the rod integrator LT.

FIG. 34 is a view of the phosphor unit viewed from the rod integrator side, and corresponds to FIG. 31 and the like, except that the direction in which the phosphor unit is viewed is different by 180 degrees. Further, as illustrated in FIGS. 32 and 33, the plane PL1 and the plane PL2 are set to be substantially 90 degrees. The term "substantially 90 degrees" means a range of angles greater than 45 degrees and less than 135 degrees. Such a configuration can separate the light ray L1 from the optical path including the light flux Q of the excitation light emitted from the phosphor unit PW. The light flux Q is easily separated from the mirror DM. Even if the plane PL1 is along the long side of the rod integrator LT, the incident direction of the excitation light is rotated by substantially 90 degrees when viewed from the incident position of the rod integrator LT, so that the excitation light can be incident from the short axis direction of the rod integrator LT.

With the above configuration, a polarized beam splitter (PBS), a wave plate, or the like, which are conventionally needed, can be obviated. Accordingly, the configuration is simplified and the optical path is three-dimensionally bent, thus allowing the direction of the light ray reaching the rod integrator to be freely changed. For example, the excitation light can be made incident so as to strike the inner side surface corresponding to the long side $LE_1$ (see FIG. 5B) of the incident aperture 104a of the rod integrator 104. Thus, the excitation light and the like can be made uniform as the number of times of reflections of the excitation light and the like inside the rod integrator 104 increases, and the occurrence of color unevenness in the excitation light and the like can be restrained.

In the embodiments described above, examples of the present disclosure are described, and embodiments of the present disclosure are not limited to the configurations of the above-described embodiments. In particular, the specific shapes and numerical values of the respective parts and components illustrated in the respective embodiments are merely examples of embodiments of the present disclosure, and the technical scope of the present disclosure is not limited thereto. The present disclosure can be appropriately modified without departing from the technical idea described in the claims.

This patent application is based on and claims priority to Japanese Patent Application No. 2019-200035, filed on Nov. 1, 2019, Japanese Patent Application No. 2019-200042, filed on Nov. 1, 2019, and Japanese Patent Application No. 2019-200043, filed on Nov. 1, 2019, in the Japan Patent Office, the entire disclosure of each of which is hereby incorporated by reference herein.

REFERENCE SIGNS LIST

1 Projector
10 Housing
20 Light-source device
21 Laser source
22 Coupling lens
23 First optical system
23a large-diameter lens
23b Negative lens
24 Dichroic mirror
24A Region (first region)
24B Region (second region)
25 Second optical system
25A, 25B Positive lenses
26 Phosphor unit
27 Refractive optical system
28 Color wheel
29 Light tunnel
29A Incident aperture
30 Illumination optical system
40 Image forming element
50 Projection optical system
60 Cooling device
100 Light-source device
101 Light source
101a Light-emitting surface
102 Dichroic mirror
102a Reflecting surface
103 Phosphor unit
103a Exit surface
103b Incident surface
104 Rod integrator
104a Incident aperture
104b Exit aperture
105 Condensing lens
105a Incident surface
105b Exit surface 106 Refractive lens
201, 202, 203 Light-source device
211 Laser source
221 Coupling lens
222 Half-wave retarder
223 Polarization splitter
241 Dichroic mirror
241A Region
261 Phosphor unit (stationary phosphor unit)
261a Reflection member
261b Phosphor

The invention claimed is:

1. A light-source device, comprising:
an excitation light source to emit first color light;
an optical element having a reflecting surface to reflect the first color light;
a wavelength converter on which the first color light reflected by the optical element is incident, the wavelength converter to convert at least part of the first color light into second color light having a wavelength different from a wavelength of the first color light and emit the second color light; and
a light condensing element to condense the first color light emitted from the wavelength converter,
wherein a straight line including a first optical path does not intersect with a light flux condensed by the light condensing element, where the first optical path is an optical path from a center of a flux of light rays emitted from the excitation light source, to a center of the first color light on the reflecting surface,
the light-source device further comprising:
a light mixing element to perform optical mixing on at least one of the first color light and the second color light emitted from the wavelength converter; and
a light guide to guide the at least one of the first color light and the second color light emitted from the wavelength converter,
wherein the light mixing element is a rod integrator, and
wherein, when the first color light is incident on the rod integrator, the first color light first strikes a surface having a long side of an incident aperture of the rod integrator.

2. The light-source device according to claim 1,
wherein the straight line including the first optical path is not parallel with and intersects with a plane that is formed by a second optical path and the light flux, where the second optical path is an optical path from the center of the first color light on the reflecting surface to the light condensing element.

3. The light-source device according to claim 1,
wherein the light mixing element is on a line perpendicular to a point on an exit surface of the wavelength converter,
the point is a center of a projection image of the first color light projected on the wavelength converter.

4. The light-source device according to claim 3, further comprising:
another condensing element disposed on an optical path between the optical element and the wavelength converter and to condense the first color light reflected by the optical element and substantially parallelizes the second color light emitted from the wavelength converter,
wherein the point on the exit surface of the wavelength converter is different in position from an intersection, where L1 represents a straight line connecting the center of the first color light on the reflecting surface of the optical element and a center of a projection image projected on an incident surface of said another condensing element by the first color light that is incident on the light condensing element after reflected by the reflecting surface, and
the intersection is an intersection of L1 and an incident surface of the wavelength converter on which the first color light condensed by said another condensing element is incident.

5. The light-source device according to claim 3,
wherein a first plane including the first optical path and a second optical path is not parallel to a second plane including a third optical path and a fourth optical path,
where the first optical path is an optical path from a substantially center of a flux of light rays emitted from the excitation light source,
the second optical path is an optical path from the center of the first color light on the reflecting surface to the light condensing element,
the third optical path is an optical path from the light condensing element to the point on the exit surface of the wavelength converter, and
the fourth optical path is an optical path from the point on the exit surface of the wavelength converter to the light condensing element.

6. The light-source device according to claim 5,
wherein the line perpendicular to the point on the exit surface of the wavelength converter does not intersect the straight line including the first optical path.

7. The light-source device according to claim 5,
wherein an angle formed by the first plane and the second plane is substantially 90 degrees.

8. The light-source device according to claim 1, further comprising:
a refractive optical element to guide the at least one of the first color light and the second color light emitted from the wavelength converter to the incident aperture of the rod integrator,
wherein a center of a projection image of the first color light projected on the incident aperture of the rod integrator, a center of a projection image of the second color light projected on the incident aperture of the rod integrator, and an optical axis of the refractive optical element intersect at one point.

9. The light-source device according to claim 1,
wherein a first incident angle is smaller than a second incident angle,
the first incident angle is an incident angle of a light ray of the first color light that is incident on the incident aperture of the rod integrator at a largest angle among light rays of the first color light, and
the second incident angle is an incident angle of a light ray of the second color light that is incident on the incident aperture of the rod integrator at a largest angle among light rays of the second color light.

10. The light-source device according to claim 9,
wherein the rod integrator is a glass rod integrator, and
wherein a third incident angle satisfies a total reflection condition of the rod integrator,
the third incident angle is greater than each of the first incident angle and the second incident angle.

11. The light-source device according to claim 1,
wherein the excitation light source includes a plurality of laser diodes arranged in array, wherein a projection area in which the first color light emitted from the plurality of laser diodes is projected on the incident aperture of the rod integrator has an elliptical shape, wherein a long axis of the elliptical shape is substantially parallel to the long side or a short side of the incident aperture of the rod integrator.

12. An image projection apparatus, comprising:

the light-source device according to claim 1;

an illumination optical system to guide light emitted from the light-source device to an image display element; and a projection optical system to project an image generated by the image display element with the light guided by the illumination optical system.

13. A light-source device, comprising:

an excitation light source to emit first color light;

an optical element having a reflecting surface to reflect the first color light;

a wavelength converter on which the first color light reflected by the optical element is incident, the wavelength converter to convert at least part of the first color light into second color light having a wavelength different from a wavelength of the first color light and emit the second color light; and a light condensing element to condense the first color light emitted from the wavelength converter, wherein a straight line including a first optical path does not intersect with a light flux condensed by the light condensing element, where the first optical path is an optical path from a center of a flux of light rays emitted from the excitation light source, to a center of the first color light on the reflecting surface, wherein the excitation light source includes:

a plurality of laser diodes arranged in rows and columns; and a plurality of coupling lenses on emission surface sides of the laser diodes, respectively, and wherein an arrangement interval of the laser diodes satisfies a relation of $1 \leq p/L\tan\theta \leq 4$, where $\theta$ is a larger one of a divergence angle in a row direction and a divergence angle in a column direction of the first color light emitted from the laser diodes, p is a pitch of adjacent ones of the laser diodes, and L is a distance from a light emission point of each of the laser diodes to a corresponding one of the coupling lenses.

14. An image projection apparatus, comprising:

a light-source device, including:

an excitation light source to emit first color light;

an optical element having a reflecting surface to reflect the first color light;

a wavelength converter on which the first color light reflected by the optical element is incident, the wavelength converter to convert at least part of the first color light into second color light having a wavelength different from a wavelength of the first color light and emit the second color light; and a light condensing element to condense the first color light emitted from the wavelength converter, wherein a straight line including a first optical path does not intersect with a light flux condensed by the light condensing element, where the first optical path is an optical path from a center of a flux of light rays emitted from the excitation light source, to a center of the first color light on the reflecting surface, the image projection device further comprising:

an illumination optical system to guide light emitted from the light-source device to an image display element; and a projection optical system to project an image generated by the image display element with the light guided by the illumination optical system, wherein an optical axis shared by a plurality of lenses of the projection optical system is not on a same plane as an emission direction of the first color light emitted from the excitation light source.

* * * * *